(12) United States Patent
Watanabe et al.

(10) Patent No.: US 8,004,601 B2
(45) Date of Patent: Aug. 23, 2011

(54) IMAGING APPARATUS USING MULTIPLE REGULATORS TO DECREASE OVERALL POWER CONSUMPTION

(75) Inventors: Tohru Watanabe, Ogaki (JP); Takashi Tanimoto, Gifu-ken (JP); Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1201 days.

(21) Appl. No.: 10/202,166

(22) Filed: Jul. 24, 2002

(65) Prior Publication Data

US 2003/0020821 A1 Jan. 30, 2003

(30) Foreign Application Priority Data

Jul. 27, 2001 (JP) ................................ 2001-228041
Apr. 11, 2002 (JP) ................................ 2002-109416

(51) Int. Cl.
*H04N 5/228* (2006.01)
(52) U.S. Cl. ............... 348/372; 348/222.1; 348/311; 348/374
(58) Field of Classification Search .............. 348/222.1, 348/372, 311, 374; 323/351
See application file for complete search history.

(56) References Cited

U.S. PATENT DOCUMENTS

| | | | |
|---|---|---|---|
| 4,945,424 A | 7/1990 | Hiroki et al. | |
| 5,493,409 A | 2/1996 | Maeda et al. | |
| 5,963,255 A | 10/1999 | Anderson et al. | |
| 6,023,539 A | 2/2000 | Ohnami et al. | |
| 6,078,210 A | 6/2000 | Uchida et al. | |
| 6,236,262 B1 | 5/2001 | Mellot | |
| 6,377,073 B1 | 4/2002 | Krasnansky | |
| 6,425,086 B1 * | 7/2002 | Clark et al. | ................... 713/322 |
| 6,484,041 B1 | 11/2002 | Aho et al. | |
| 6,785,394 B1 | 8/2004 | Olsen et al. | |
| 6,856,352 B1 | 2/2005 | Kijima | |
| 7,129,985 B1 | 10/2006 | Koizumi et al. | |
| 7,365,792 B2 | 4/2008 | Watanabe et al. | |
| 2003/0043287 A1 | 3/2003 | Kakiuchi et al. | |
| 2003/0200473 A1 | 10/2003 | Fung | |
| 2003/0218690 A1 | 11/2003 | Sakaegi | |
| 2004/0120690 A1 | 6/2004 | Takeshita et al. | |
| 2008/0170153 A1 | 7/2008 | Watanabe et al. | |

FOREIGN PATENT DOCUMENTS

| | | |
|---|---|---|
| JP | 57-29916 | 2/1982 |
| JP | 57-085110 | 5/1982 |
| JP | 63-246081 | 10/1988 |
| JP | 02-082774 | 3/1990 |
| JP | 02-248170 | 10/1990 |
| JP | 10-150766 | 6/1998 |
| JP | 10-174048 | 6/1998 |

(Continued)

OTHER PUBLICATIONS

"TLC876M Analog-To-Digital Converters" Texas Instruments SLAS140E—Jul. 1997—Revised Oct. 2000.

(Continued)

*Primary Examiner* — Yogesh K Aggarwal

(57) ABSTRACT

An imaging apparatus for reducing power consumption. The apparatus includes a first regulator connected to a signal processing circuit and a second regulator connected to an output circuit. The first regulator generates a first regulated voltage that is in accordance with an output level of a solid-state image sensor. The second regulator generates a second regulated voltage that is in accordance with an input level of an external device.

26 Claims, 18 Drawing Sheets

FOREIGN PATENT DOCUMENTS

| | | |
|---|---|---|
| JP | 10-337001 | 12/1998 |
| JP | 11-296241 | 10/1999 |
| JP | 11-331682 | 11/1999 |
| JP | 2000-224495 | 8/2000 |

OTHER PUBLICATIONS

Ackland et al., "Camera on a Chip", IEEE, Feb. 8, 1996, pp. 22-26.
Action and Response History for U.S. Appl. No. 10/208,341, through Apr. 23, 2008.
Action and Response History for U.S. Appl. No. 12/041,740, through Oct. 7, 2009.
Action and Response History for U.S. Appl. No. 10/208,614, through Apr. 9, 2008.
Action and Response History for U.S. Appl. No. 10/208,141, through Aug. 28, 2006.
Action and Response History for U.S. Appl. No. 10/208,588, through Jan. 17, 2007.
Action and Response History for U.S. Appl. No. 10/235,246, through Jan. 11, 2006.
Action and Response History for U.S. Appl. No. 10/261,398, through Mar. 13, 2008.
Action and Response History for U.S. Appl. No. 10/328,407, through Sep. 27, 2006.
Notification for Reasons for Rejection for counterpart Japanese Patent Application No. 2002-109417, mailed Jun. 30, 2006, with English translation, 5 pages.
Decision of Rejection for counterpart Japanese Patent Application No. 2002-109417, drafted Sep. 27, 2006, with English translation, 3 pages.
Amendment filed for counterpart Japanese Patent Application No. 2002-109417, filed Oct. 27, 2006, with English translation, 5 pages.
Amendment to Non-Final Office Action for U.S. Appl. No. 12/041,740, filed Jun. 30, 2010, 10 pages.
Non-Final Office Action from U.S. Appl. No. 12/041,740, mailed Apr. 5, 2010, 21 pages.
Amendment and Reply to Office Action mailed Apr. 5, 2010 for U.S. Appl. No. 12/041,740, filed Jun. 30, 2010, 10 pages.
Final Office Action for U.S. Appl. No. 12/041,740, mailed Sep. 21, 2010, 14 pages.
Amendment and Reply to Final Office Action mailed Sep. 21, 2010 for U.S. Appl. No. 12/041,740, filed Jan. 21, 2011, 11 pages.

* cited by examiner

IMAGING APPARATUS USING MULTIPLE REGULATORS TO DECREASE OVERALL POWER CONSUMPTION

BACKGROUND OF THE INVENTION

The present invention relates to an imaging apparatus using a solid-state imaging device.

An imaging apparatus using a solid-state imaging device (CCD image sensor), such as a digital still camera, often uses a battery as a power supply. The range of the output voltage of a battery is limited. Therefore, a regulator or a booster is employed to drive the CCD image sensor.

FIG. 1 is a schematic block diagram of a prior art imaging apparatus 50. The imaging apparatus 50 includes a regulator 2, a CCD image sensor 3, a drive device 4, and an image signal processor 7. The signal processor 7 includes a horizontal driver 8, a signal processing circuit 9, a timing control circuit 13, and an output circuit 14.

The regulator 2 is supplied with power supply voltage from a battery. The regulator 2 converts the power supply voltage to a predetermined voltage Vk. The imaging apparatus 50 operates with the same operational voltage Vk, which is generated by the imaging device.

The CCD image sensor 3 is, for example, a frame transfer type, and includes an imaging section 3a, a charge section 3b, a horizontal transfer section 3c, and an output section 3d. The imaging section 3a has a matrix of light receiving pixels. Each light receiving pixel accumulates information charges generated in accordance with an imaging subject. The charge section 3b temporarily stores the information charges corresponding to a single screen image that is retrieved from the imaging section 3a. The horizontal transfer section 3c sequentially retrieves the information charges from the charge section 3b and sequentially transfers the information charges in the horizontal direction in units of single pixels. The output section 3d receives information charges from the horizontal transfer section 3c, converts the information charges in units of single pixels to voltage values corresponding to the information charges, and generates an image signal Y(t). The image signal Y(t) is provided to the signal processor 7.

The drive device 4 includes a booster 5 and a vertical driver 6, which are formed on the same semiconductor substrate. The booster 5 includes a positive voltage generating charge pump and a negative voltage generating charge pump. The positive voltage generating charge pump increases the regulated voltage VK (e.g., 2.9V) to a predetermined positive voltage VOH (e.g., 5V) and supplies the positive voltage VOH to the CCD image sensor 3. The negative voltage generating charge pump boosts the regulated voltage VK to a predetermined negative voltage VOL (e.g., −5V) and supplies the negative voltage VOL to the vertical driver 6.

The vertical driver 6 operates with the negative voltage VOL and generates a frame transfer clock signal of and a vertical transfer clock signal $\phi$v. The clock signals of and $\phi$v are respectively provided to the imaging section 3a and the charge section 3b of the CCD image sensor 3. The frame transfer clock signal of and the vertical transfer clock $\phi$v are generated in accordance with a frame shift timing signal FT, a vertical synchronizing signal VT, and a horizontal synchronizing signal HT, which are provided from the timing control circuit 13 of the signal processor 7. The information charges that are accumulated in the charge section 3b are line-transferred to the horizontal transfer section 3c at a timing that is in accordance with the vertical synchronizing signal VT and the horizontal synchronizing signal HT.

The signal processor 7 includes a horizontal driver 8, a signal processing circuit 9, a timing control circuit 13, and an output circuit 14. The horizontal driver 8 operates with the regulated voltage VK and generates a horizontal transfer clock signal $\phi$h. The horizontal transfer clock signal $\phi$h is provided to the horizontal transfer section 3c of the CCD image sensor 3. The horizontal transfer clock signal $\phi$h is generated in accordance with the vertical synchronizing signal VT and the horizontal synchronizing signal HT, which are provided from the timing control circuit 13 of the signal processor 7. The information charges retrieved in the horizontal transfer section 3c are horizontally transferred at a timing that is in accordance with the horizontal synchronizing signal HT and converted to an image signal Y(t) by the output section 3d.

The signal processing circuit 9, which includes an analog processing circuit 10, an A/D converter 11, and a digital processing circuit 12, operates with the regulated voltage VK, which is provided from the regulator 2. The analog processing circuit 10 receives an image signal Y(t) from the CCD image sensor 3 and performs analog signal processing, such as a correlated double sampling (CDS) process and an automatic gain control (AGC) process, on the image signal Y(t). In the CDS process, the image signal Y(t), which repeats the reset level and the signal level, is clamped at the reset level. Subsequently, the signal level is extracted from the image signal Y(t) and an image signal having a continuous signal level is generated. In the AGC process, the image signals retrieved in the CDS process are integrated in units of single image screens or single vertical scan terms. The gain is feedback-controlled so that the integrated data is included in a predetermined range. The A/D converter 11 receives an image signal from the analog processing circuit 10, standardizes the image signal in synchronism with the image output timing of the CCD image sensor 3, and generates a digital image data signal Y(n). The digital image data Y(n) is provided to the digital processing circuit 12.

The digital processing circuit 12 performs processes such as color separation and a matrix operation on the digital image signal Y(n) to generate an image data signal Y'(n), which includes a luminance signal and a chrominance signal. For example, in the color separation process, the digital processing circuit 12 separates the image data Y(n) in accordance with a color array of a color filter, which is attached to the imaging section 3a of the CCD image sensor 3, to generate a plurality of color component signals. In the matrix operation process, the digital processing circuit 12 generates the luminance signal by synthesizing the separated color components and generates the chrominance signal by subtracting luminance components from each color component.

The timing control circuit 13 includes a plurality of counters (not shown), which count a reference clock signal CK that has a constant cycle, and determines a vertical scan and horizontal scan timing of the CCD image sensor 3. The timing control circuit 13 divides the reference clock signal CK, which is provided via a clock supply terminal (not shown), to generate the frame shift timing signal FT, the vertical synchronizing signal VT, and the horizontal synchronizing signal HT. The timing control circuit 13 provides the analog processing circuit 10, the A/D converter 11, and the digital processing circuit 12 with a timing signal to synchronize the operations of the analog processing circuit 10, the A/D converter 11, and the digital processing circuit 12 with the operational timing of the CCD image sensor 3.

The output circuit 14 operates in accordance with the regulated voltage VK, receives the image data signal Y'(n) from the digital processing circuit 12 of the signal processing circuit 9, and provides the image data signal Y'(n) to external device including a central processing unit (CPU) 16, a memory 17, or a display driver 18 via a system bus 15. The CPU 16 centrally controls the operations of the imaging apparatus 50, the memory 17, and the display driver 18 in response to commands from peripheral devices. The memory 17 is a removable memory (e.g., memory card or flash memory) or a fixed memory, such as a hard disk, and stores image data signal Y'(n), which is provided from the imaging apparatus 50. The display driver 18 receives the image data signal Y'(n) from the imaging apparatus 50, drives the display panel 19 to display a reproduced image.

The imaging apparatus 50 functions in the following manner. When the regulator 2 is supplied with power supply voltage VDD (e.g., 3.2V) from a battery, the regulator 2 generates the regulated voltage VK (e.g., 2.9V), which is lower than the power supply voltage VDD. Then, the regulated voltage VK is supplied to the drive device 4 and the signal processor 7.

The positive voltage generation charge pump of the booster 5 boosts the regulated voltage VK to a predetermined positive voltage (e.g., 5V) and supplies the CCD image sensor 3 with the positive voltage as the disposal voltage of an electronic shutter. Further, the negative voltage generation charge pump of the booster 5 boosts the regulated voltage VK to a predetermined voltage (e.g., −5V) and supplies the vertical driver 6 with the negative voltage. In accordance with the negative voltage, the vertical driver 6 provides the imaging section 3a and the charge section 3b with the frame transfer clock signal of and the vertical transfer clock signal φv, which are required for frame-transfer and line-transfer of the CCD image sensor 3.

In the signal processor 7, the regulated voltage VK is supplied to the horizontal driver 8, the signal processing circuit 9, the timing control circuit 13, and the output circuit 14. The timing control circuit 13 generates various types of timing signals. The horizontal driver 8 performs a predetermined analog signal process and digital signal process on the image signal Y(t), which is provided from the CCD image sensor 3. The image circuit provides the image data signal Y'(n) to the external device via the system bus 15.

In the signal processor of the imaging apparatus 50, after the regulator 2 regulates the power supply voltage VDD from the battery to the predetermined regulated voltage VK, the regulated voltage VK is commonly supplied to every circuit of the signal processor 7. Thus, the circuits of the signal processor 7 are supplied with the same power supply voltage. The value of the regulated voltage VK is set in accordance with the operational voltage of the output circuit 14, which is normally greater than the operational voltage of the signal processing circuit 9. Therefore, even though the signal processing circuit 9 is operated by the power supply voltage, which is less that the regulated voltage VK, the signal processing circuit 9 is supplied with the regulated voltage VK, which is greater than the operational voltage. As a result, the signal processing circuit 9 consumes unnecessary power. This may increase the power consumption of the imaging apparatus 50.

SUMMARY OF THE INVENTION

It is an object of the present invention to provide an imaging apparatus that reduces power consumption.

To achieve the above object, the present invention provides an imaging apparatus for performing a predetermined signal process on a first image signal and generating a second image signal, which is provided to an external device and complies with a predetermined format. The imaging apparatus has a solid-state imaging device including a matrix of light receiving pixels that generate information charges in accordance with an imaging subject and accumulate the information charges. The solid-state imaging device generates the first image signal in accordance with the accumulated information charges. A booster is supplied with a power supply voltage to boost the power supply voltage and generate a boosted voltage. A first regulator is supplied with the power supply voltage to generate a first regulated voltage that is in accordance with an output level of the solid-state imaging device. A second regulator is supplied with the power supply voltage to generate a second regulated voltage that is in accordance with an input level of the external device. A drive circuit is connected to the booster and supplied with the boosted voltage. The drive circuit drives the solid-state device to transfer the information charges accumulated in each light receiving pixel and generate the first image signal A signal processing circuit is connected to the solid-state imaging device and the first regulator and operates with the first regulated voltage. The signal processing circuit performs a predetermined signal process on the first image signal and generates the second image signal. An output circuit connected to the second regulator and the signal processing circuit and operates with the second regulated voltage. The output circuit receives the second image signal from the signal processing circuit and provides the second image signal to the external device.

A further perspective of the present invention is an imaging apparatus for performing a predetermined signal process on a first image signal and generating a second image signal, which is provided to an external device and complies with a predetermined format. The imaging apparatus has a solid-state imaging device including a matrix of light receiving pixels that generate information charges in accordance with an imaging subject and accumulate the information charges. The solid-state imaging device generates the first image signal in accordance with the accumulated information charges. A booster is supplied with a power supply voltage to boost the power supply voltage and generate a boosted voltage. A first regulator is supplied with the power supply voltage to generate a first regulated voltage that is in accordance with an output level of the solid-state imaging device. A drive circuit is connected to the booster and supplied with the boosted voltage. The drive circuit drives the solid-state device to transfer the information charges accumulated in each light receiving pixel and generate the first image signal. A signal processing circuit is connected to the solid-state imaging device and the first regulator and operates with the first regulated voltage. The signal processing circuit performs a predetermined signal process on the first image signal and generates the second image signal. An output circuit is connected to the signal processing circuit and operates with the power supply voltage. The output circuit receives the second image signal from the signal processing circuit and provides the second image signal to the external device.

A further perspective of the present invention is a method for supplying a power supply voltage in an imaging apparatus. The imaging apparatus includes a solid-state imaging device for generating information charges and for generating a first image signal in accordance with the information charges. A signal processing circuit performs a predetermined signal processing on the first image signal to generate a second image signal complying with a predetermined format. An output circuit receives the second image signal from the signal processing circuit and provides the second image signal to an external device. The method includes generating a first regulated voltage that is in accordance with an output level of the solid-state imaging device with a supplied power supply voltage, supplying the first regulated voltage to the signal processing circuit, generating a second regulated voltage that is in accordance with an input level of the external device with a supplied power supply voltage, and supplying the second regulated voltage to the output circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
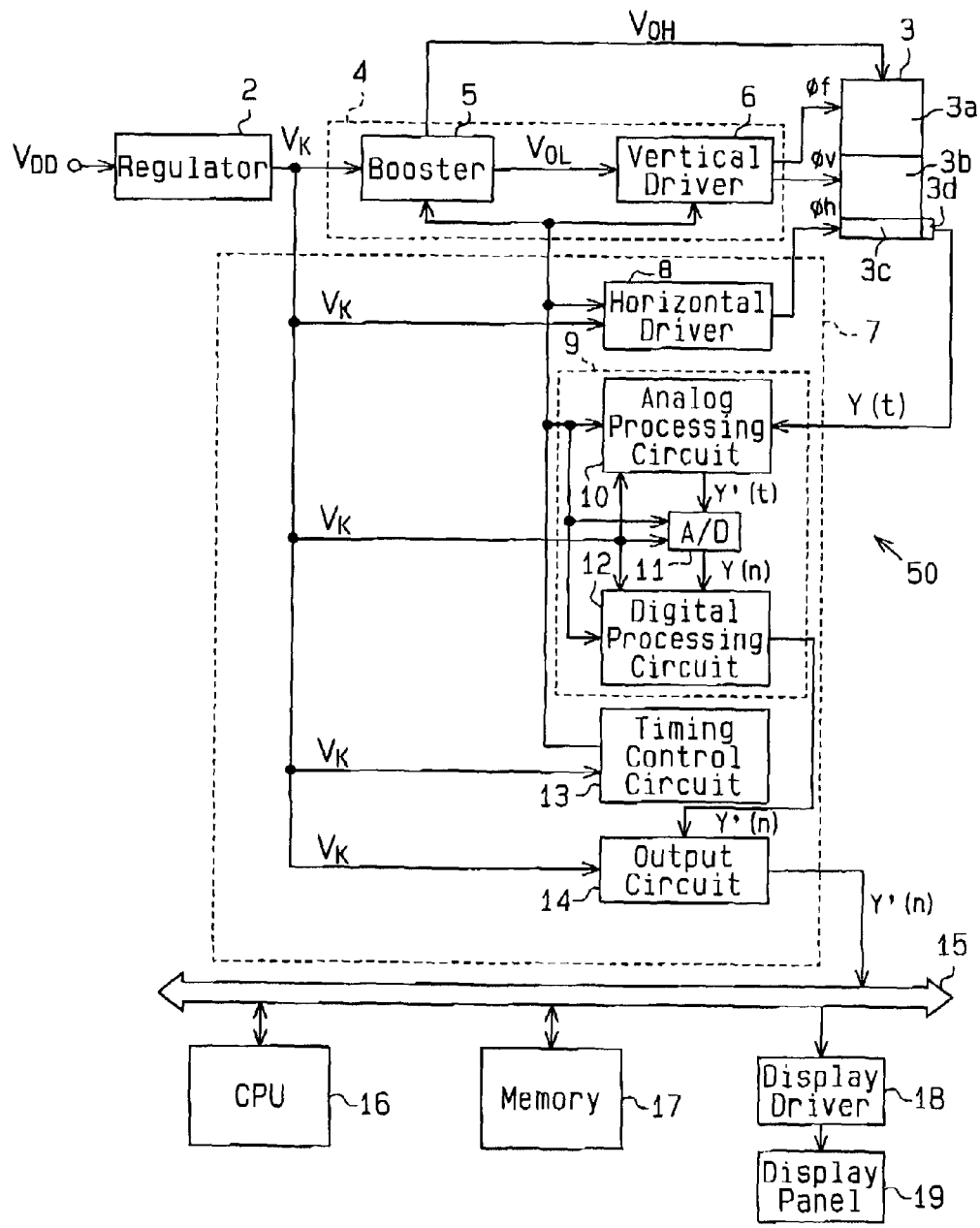
FIG. 1 is a schematic block diagram of a prior art imaging apparatus.

In the drawings, like numerals are used for like elements throughout.

Figure 2:
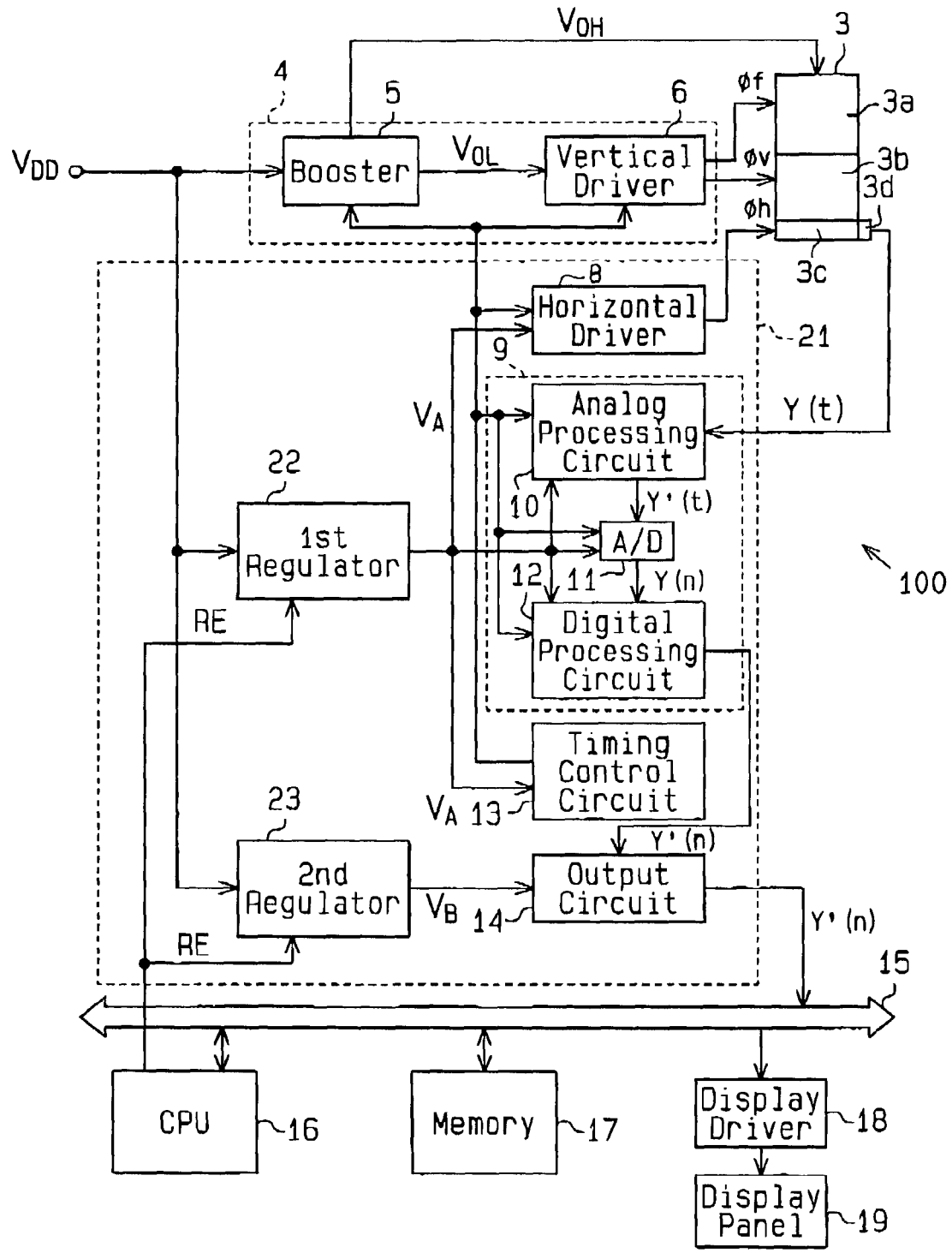
FIG. 2 is a schematic block diagram of an imaging apparatus according to a first embodiment of the present invention.

FIG. 2 is a schematic block diagram of an imaging apparatus 100 according to a first embodiment of the present invention.

The imaging apparatus 100 includes a CCD image sensor 3, a drive device 4, and a signal processor 21. The CCD image sensor 3 has a matrix of light receiving pixels. Each light receiving pixel accumulates information charges generated in accordance with an imaging subject. The drive device 4, which includes a booster 5 and a vertical driver 6, drives the CCD image sensor 3 to generate an image signal Y(t) in correspondence with the information charges stored in each light receiving pixel.

The signal processor 21 includes a horizontal driver 8, a signal processing circuit 9, and an output circuit 14. The signal processor 21 performs a predetermined signal process on the image signals Y(t) provided from the CCD image sensor 3 to generate an image data signal Y'(n), which includes a luminance signal and a chrominance signal. The image data signal Y'(n) is provided to external device including a memory 17 or a display driver 18 via a system bus 15. Further, the signal processor 21 includes a first regulator 22 and a second regulator 23. The first regulator 22 is connected to the horizontal driver 8 and the signal processing circuit 9. The second regulator 23 is connected to the output circuit 14. The feature of the imaging apparatus 100 of the first embodiment is in that the first and second regulators 22, 23 respectively supply independent power supply voltages to the signal processing circuit 9 and the output circuit 14.

The first and second regulators 22, 23 are each connected to a battery (not shown) via a power supply terminal (not shown) to receive a power supply voltage VDD from the battery. The first regulator 22 generates a first regulated voltage VA from the power supply voltage VDD. The second regulator 23 generates a second regulated voltage VB from the power supply voltage VDD. The first regulated voltage VA is substantially equal to the optimal functional voltage of the horizontal driver 8 and the signal processing circuit 9 (e.g., 2.0 to 2.5V). That is, the first regulated voltage VA is set in accordance with an output level of the CCD image sensor 3. The second regulated voltage VB is set to correspond with the optimal operational voltage of the output circuit 14 (e.g., 2.9V), or the input level of external device.

The first and second regulators 22, 23 each operate in accordance with the operating state of the system bus 15, which is connected to the output circuit 14. More specifically, when the transmission of data and control signals between the signal processor 21 and the external device via the system bus 15 is not performed, or when the system bus 15 is not used, the generation of the first and second regulated voltages VA, VB is stopped. The first and second regulators may stop generating the first and second regulated voltages VA, VB during at least part of the time in which the bus 15 is not being used. That is, the first and second regulators 22, 23 are operated in accordance with a control signal RE, which is provided from a CPU 16 and indicates the state of the system bus 15. When the control signal RE indicates a state in which the system bus 15 is not being used, the generation of the first and second regulated voltages VA, VB is stopped. This lowers the output voltage of the first and second regulators 22, 23 to the ground voltage VG (e.g., 0V). Accordingly, when the system bus 15 is not used, or when the CCD image sensor 3 and the external device stop operating, the power supply voltage is not supplied to the signal processing circuit 9 and the output circuit 14.

The stopping of the supply of power supply voltage to the signal processing circuit 9 and the output circuit 14 is especially effective when the signal processor 21 functions using an external battery as a power source. When the power supply side does not have a means for cutting the supply of power from the battery, the signal processor 21 may be supplied with the power supply voltage even if the entire system, which includes the CCD image sensor 3 and the external device, is not operating. It the power supply voltage is supplied, this may cause a current leak in a circuit even if the signal processing circuit 9 and the output circuit 14 are not operating. This would result in power consumption. Accordingly, since the supply of power supply voltage from the battery is stopped when the CCD image sensor 3 and the external device stop operating, the current leaks that occur at the circuits 9, 14 are prevented. This avoids unnecessary power consumption.

The imaging apparatus 100 operates in the following manner. When the battery supplies the imaging apparatus 100 is supplied with the power supply voltage VDD (e.g., 3.2V), the power supply voltage VDD is supplied to the booster 5, the first regulator 22, and the second regulator 23. The booster 5 boosts the power supply voltage VDD to a predetermined positive voltage VOH (e.g., 5V) and negative voltage VOL (e.g., −5V). The positive voltage VOH is supplied to the CCD image sensor 3 as an electronic shutter disposal voltage, and the negative voltage VOL is supplied to the vertical driver 6.

The first regulator 22 converts the power supply voltage VDD to a first regulated voltage VA (e.g., 2.0V to 2.5V), which is optimal for the horizontal driver 8 and the signal processing circuit 9. The first regulated voltage VA is provided to the horizontal driver 8 and the signal processing circuit 9. The information charges of a horizontal transfer section 3c of the image sensor 3 are horizontal-transferred. Further, the signal processing circuit 9 performs a predetermined signal process on the image signal Y(t). The second regulator 23 converts the power supply voltage VDD to a second regulated voltage VB (e.g., 2.9V), which is in accordance with the input level of the external device. The second regulated voltage VB is supplied to the output circuit 14. The image signal Y′(n), which has undergone signal processing, is provided to the external device from the output circuit 14.

In the signal processor 21 of the first embodiment, the first and second regulators 22, 23 respectively and independently supply the signal processing circuit 9 and the output circuit 14 with the regulated voltages. Thus, the signal processing circuit 9 and the output circuit 14 are each operated by an optimal power supply voltage. As a result, unnecessary power is not consumed. This reduces power consumption. Further, the output voltages of the regulators 22, 23 are set at the optimal voltages of the associated signal processing circuit 9 and the output circuit 14. Thus, the signal processing circuit 9 and the output circuit 14 are each supplied with the optimal operational voltage. This improves the operational characteristics of the signal processing circuit 9 and the output circuit 14.

Figure 3:
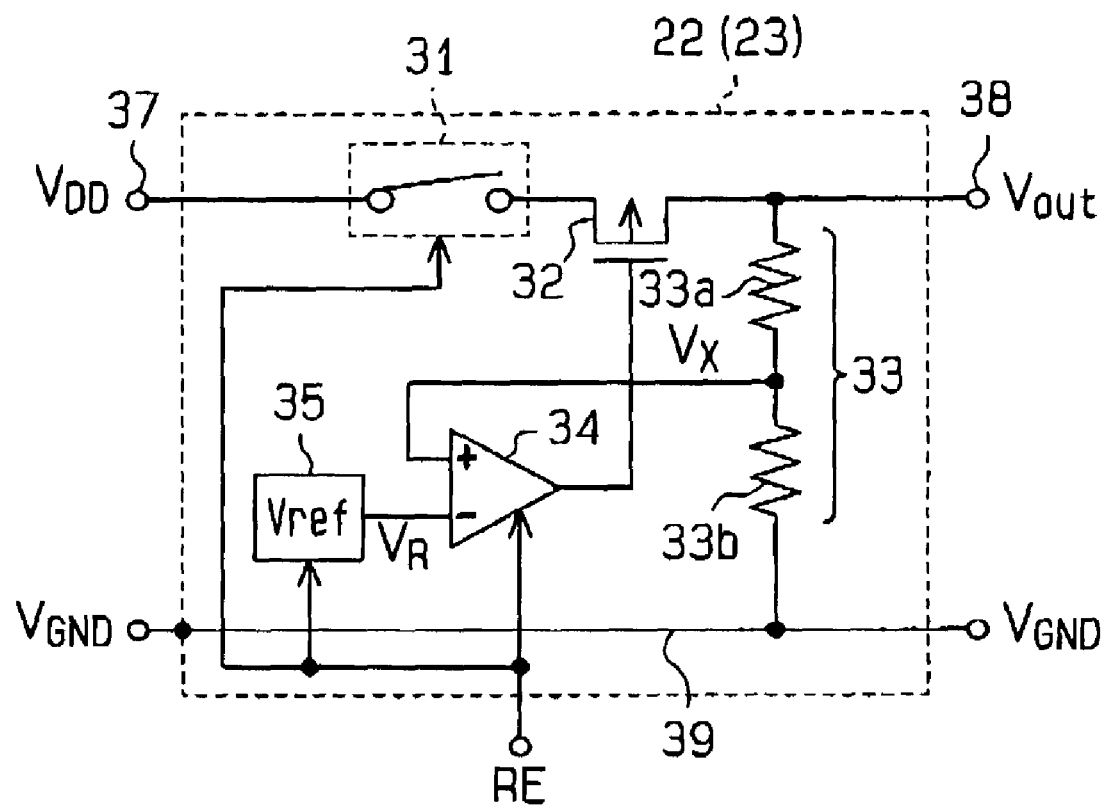
FIG. 3 is a schematic circuit diagram of first and second regulators of the imaging apparatus of FIG. 2.

FIG. 3 is a schematic circuit diagram of the first and second regulators 22, 23. The first and second regulators 22, 23 basically have the same configuration and each includes a switch 31, a p-channel transistor 32, a resistor string 33, a comparator 34, and a reference voltage generation circuit 35.

The switch 31 is connected between a power supply terminal 37 and the p-channel transistor 32. The p-channel transistor 32 is connected between the switch 31 and the output terminal 38. The gate of the p-channel transistor 32 is connected to the output terminal of the comparator 34. The resistor string 33 includes resistors 33a, 33b, which are connected in series between the drain of the p-channel transistor 32 and the ground. The median point between the resistor 33a and the resistor 33b is connected to a non-inverting terminal of the comparator 34. The reference voltage generation circuit 35 is connected to an inverting input terminal of the comparator 34.

The first and second regulators 22, 23 function in the following manner. The resistances of the resistor 33a and the resistor 33b are represented by R1 and R2. When the power supply voltage VDD is supplied via the power supply terminal, the p-channel transistor 32 goes on and the power supply voltage VDD is supplied to the resistor string 33. The resistor string 33 divides the power supply voltage VDD and generates a divided voltage VX=(R2/(R1+R2))·VDD at the median point of the resistor string 33. The divided potential VX is provided to the non-inverting input terminal of the comparator 34.

Then, the comparator 34, which is operated in accordance with the potential difference between the divided potential VX and the reference voltage VR, controls the ON resistance of the p-channel transistor 32 so that the divided voltage VX and the reference voltage VR are equalized. More specifically, when the divided voltage VX is greater than the reference voltage VR, the comparator 34 causes the p-channel transistor 32 to go ON. When the divided voltage VX is less than the reference voltage VR, the comparator 34 causes the p-channel transistor 32 to go OFF. The first and second regulators 22, 23 each generate a constant voltage (regulated voltage) VOUT=((R1+R2)/R2)·VR from the ratio of the resistances R1, R2 of the resistors 33a, 33b and the reference voltage VR of the reference voltage generation circuit 35.

In the first and second regulators 22, 23, the dividing ratio of the resistor string 33 and the reference voltage VR are set in accordance with the optimum functional voltage of the following stage. This generates an optimal regulated voltage for the following stage.

The switch 31, the comparator 34, and the reference voltage generation circuit 35 receive the control signal RE from the CPU 16 and function in accordance with the operational state of the system bus 15. More specifically, when the level of the control signal RE corresponds to a state in which the system bus 15 is being used, the switch 31 connects the power supply terminal 37 and the p-channel transistor 32. The reference voltage generation circuit 35 generates the reference voltage VR, and the comparator 34 controls the ON resistance of the p-channel transistor 32 to equalize the divided voltage VX and the reference voltage VR. When the level of the control signal CE corresponds to a state in which the system bus 15 is not being used, the switch 31 disconnects the power supply terminal 37 and the transistor 32. Thus, the comparator 34 and the reference voltage generation circuit 35 stop functioning.

Since the regulators 22, 23 stop functioning when the system bus 15 is not being used, current leakage in the signal processing circuit 9 and the output circuit 14 is prevented. Further, the amount of power consumed by the regulators 22, 23 is decreased. This further reduces the power consumption of the signal processor 21.

In the first embodiment, the first and second regulators 22, 23 are arranged in the signal processor 21 and arranged on the same single chip semiconductor substrate as the signal processor 21. Thus, the first and second regulators 22, 23 are manufactured simultaneously with the other circuits of the signal processor 21. This reduces cost and increases the manufacturing yield.

Figure 4:
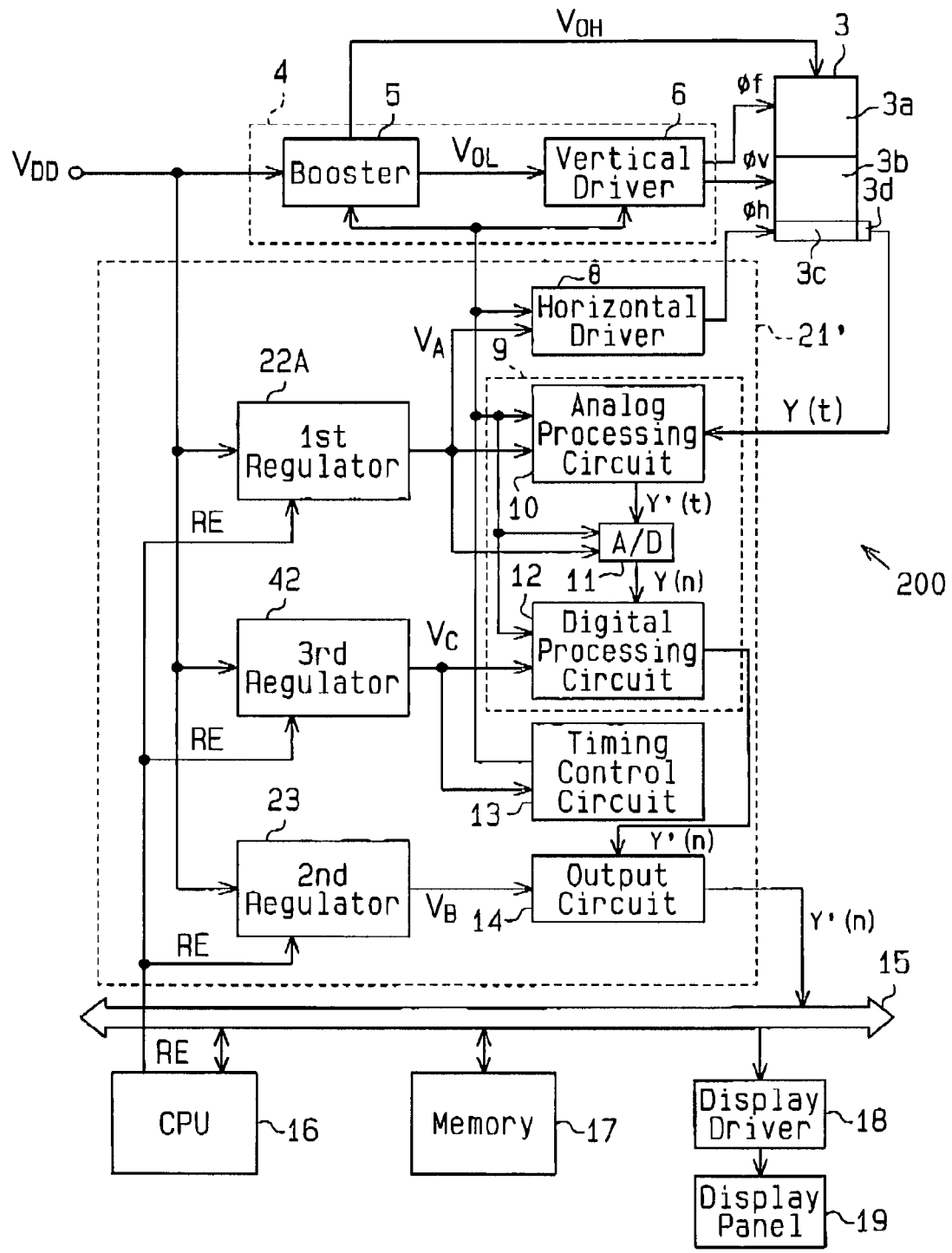
FIG. 4 is a schematic block diagram of an imaging apparatus according to a second embodiment of the present invention.

FIG. 4 is a schematic block diagram of an imaging apparatus 200 according to a second embodiment of the present invention. As shown in FIG. 4, the imaging apparatus 200 includes a CCD image sensor 3, a drive device 4, and a signal processor 21′. The signal processor 21′ includes a horizontal driver 8, a signal processing circuit 9, a timing control circuit 13, an output circuit 14, and three regulators 22A, 23, 42.

A first regulator 22A of the signal processor 21' is connected to the analog processing circuit 10 and the A/D converter 11. The third regulator 42 is connected to the digital processing circuit 12 and the timing control circuit 13.

The first regulator 22A generates a voltage that is substantially equal to the optimum operational voltage of the analog processing circuit 10 and the A/D converter 11 (e.g., 2.5V). The first regulator 22A, which is supplied with the power supply voltage VDD from the battery (not shown), generates the first regulated voltage VA. The second regulator 23, which is supplied with the power supply voltage VDD from the battery, generates the second regulated voltage VB (e.g., 2.9V), which is greater than the first regulated voltage VA.

The third regulator 42 generates a voltage that is substantially equal to the optimum operational voltage of the digital processing circuit 12 and the timing control circuit 13 (e.g., 2.0V). The third regulator 42, which is supplied with the power supply voltage VDD from the battery, generates a third regulated voltage VC, which is less than the first regulated voltage VA.

In the signal processor 21' of the second embodiment, the analog processing circuit 10 and the digital processing circuit 12 are each provided with a regulator. Thus, the analog processing circuit 10 and the digital processing circuit 12 are each supplied with the optimal power supply voltage. This improves the operational characteristics for signal processing in the signal processing circuit 9 and the output circuit 14. The third regulator 42 generates the third regulated voltage VC, which is less than the first regulated voltage VA, and supplies the digital processing circuit 12 independently with the third regulated voltage VC. Since the digital processing circuit 12 is supplied with the optimal power supply voltage, the power consumption of the digital processing circuit 12 is reduced.

The configuration of the third regulator 41 is substantially the same as the first and second regulators 22, 23 of FIG. 3. The dividing ratio of the resistor string 33 and the reference voltage VR of the reference voltage generation circuit 35 in the third regulator 42 are set in accordance with the optimum operational voltage of the digital processing circuit 12. Further, the third regulator 41 operates in accordance with the control signal RE.

The imaging apparatus 200 of the second embodiment has the advantage described below.

When the control signal RE stops the operation of the regulators 22A, 23, 42, the supply of the first to third regulated voltages VA-VC is stopped. Further, the operations of the reference voltage generation circuit 35 and the comparator 34 in the regulators 22A, 23, 42 are stopped. This stops the supply of the power supply voltage to the analog processing circuit 10 and the digital processing circuit 12 and prevents power consumption by the regulators 22A, 23, 42 when the entire system, which includes the CCD image sensor 3 and the external device, stops operating. As a result, the power consumption of the signal processor 21' is reduced.

Figure 5:
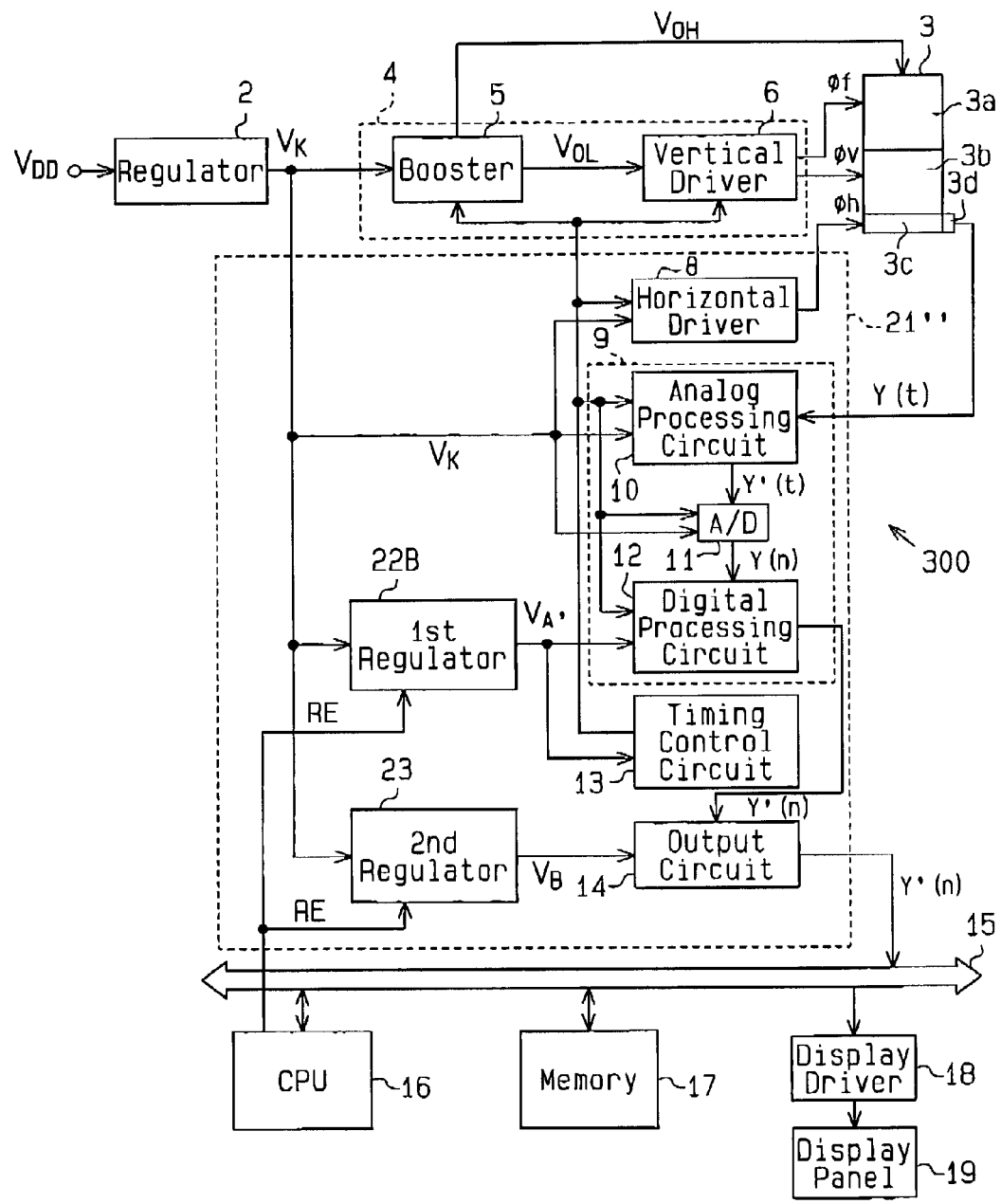
FIG. 5 is a schematic block diagram of an imaging apparatus according to a third embodiment of the present invention.

FIG. 5 is a schematic block diagram of an imaging apparatus 300 according to a third embodiment of the present invention. The imaging apparatus 300 includes the external regulator 2 of FIG. 1. Thus, in the third embodiment, a signal processor 21" does not have the first regulator 22A of the second embodiment.

In the third embodiment, the output voltage VK of the external regulator 2 is supplied to the horizontal driver 8, the analog processing circuit 10, the A/D converter 11, the first regulator 22B, and the second regulator 23.

The output voltage (regulated voltage) VK of the external regulator 2 is set at the optimum operational voltage of the horizontal driver 8, the analog processing circuit 10, and the A/D converter 11 (e.g. 2.5V). In the third embodiment, the output voltage VK of the external regulator 2 is the power supply voltage of the signal processor 21".

The first regulator 22B, which is connected to the digital processing circuit 12 and the timing control circuit 13, generates a first regulated voltage VA', which is substantially equal to the optimum operational voltage of the digital processing circuit 12 and the timing control circuit 13 (e.g., 2.0V). The first regulator 22B, which is supplied with the regulated voltage VK from the external regulator 2, generates a first regulated voltage VA' in accordance with the power supply voltage VK.

The second regulator 23, which is supplied with the regulated voltage VK from the external regulator 2. Further, the second regulator 23 generates a second regulated voltage VB, which is substantially equal to the optimum operational voltage of the output circuit 14 (e.g., 1.8V). The second regulated voltage VB, which corresponds to the input level of the external device, is supplied to the output circuit 14.

The imaging apparatus 300 of the third embodiment has the advantages described below.

The circuits of the signal processor 21" are supplied with the optimal voltage in the same manner as the first and second embodiments. Further, unnecessary power is not consumed.

Figure 6:
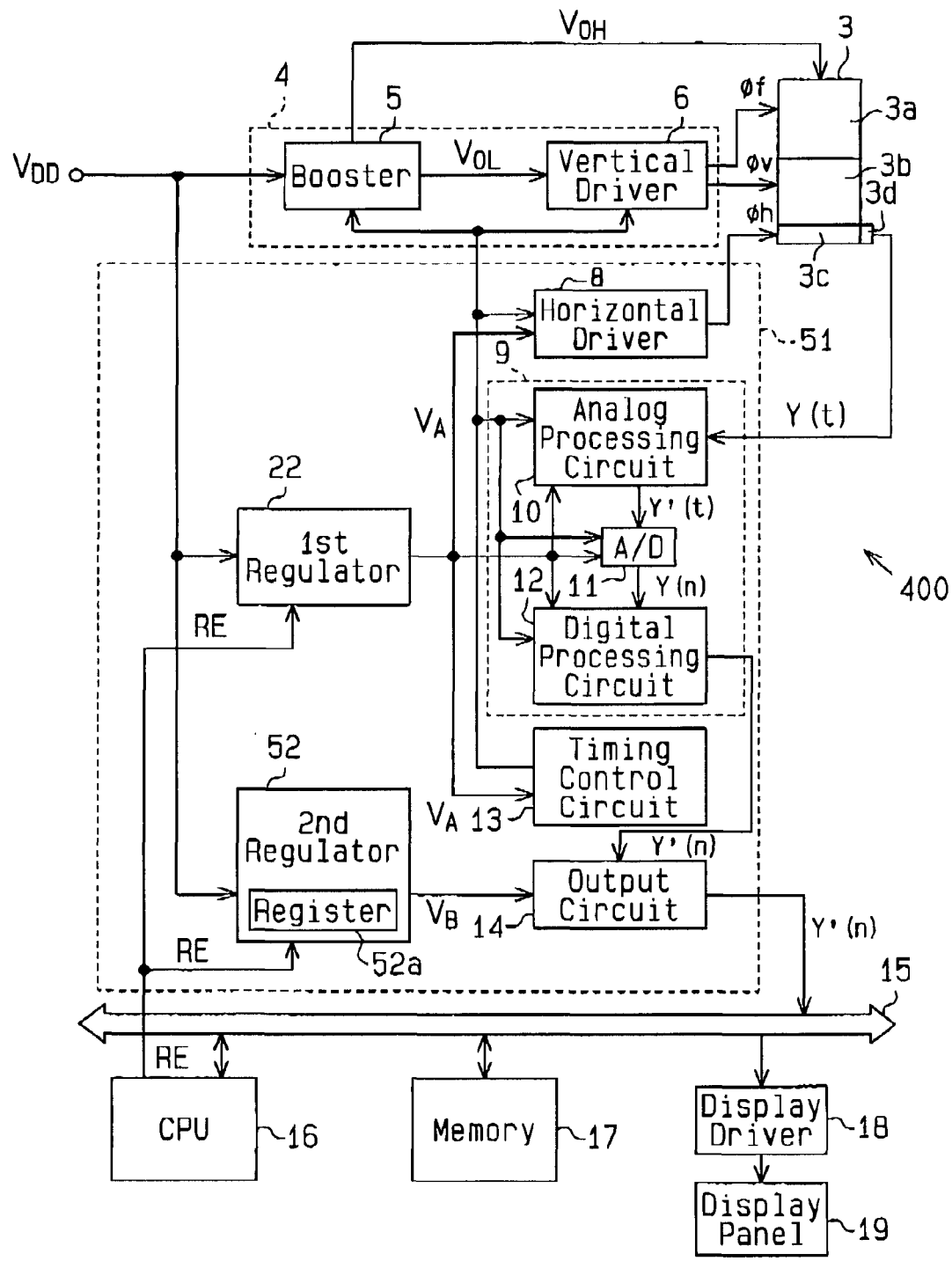
FIG. 6 is a schematic block diagram of an imaging apparatus according to a fourth embodiment of the present invention.

FIG. 6 is a schematic block diagram of an imaging apparatus 400 according to a fourth embodiment of the present invention. The imaging apparatus 400 includes the CCD image sensor 3, the drive device 4, and a signal processor 51. The signal processor 51 includes the horizontal driver 8, the signal processing circuit 9, the timing control circuit 13, the output circuit 14, the first regulator 22, and a second regulator 52.

The first regulator 22 generates the first regulated voltage VA, which is substantially the same as the optimum operational voltage (e.g., 2.0 to 2.5V) of the horizontal driver 8 and the signal processing circuit 9. The second regulator 52 generates the second regulated voltage VB (i.e., the voltage corresponding to the input level of the external device), which is substantially equal to the optimum operational voltage of the output circuit 14, from the power supply voltage VDD. A plurality of regulated voltages are set in a stepped manner in the second regulator 52. In accordance with a change of the external device, the second regulator 52 selects one of the regulated voltages in accordance with a change of the external device. The regulated voltages are each set beforehand in accordance with the input level of each of the external devices that may be connected to the system bus. The second regulator 52 includes a register 52a, which stores a set value S for determining the regulated voltage.

To shift the regulated voltage in accordance with a change of the external device, the second regulator 52 operates in the following manner. When a change of the external device occurs, the CPU 16 provides the signal processor 51 with a signal (not shown) indicating the operational voltage of the external device subsequent to the change or operating condition such as the operational timing subsequent to the change. Further, the operating conditions of each circuit in the signal processor 51 are initialized, In this state, the register 52a of the second regulator 52 outputs the set value S in accordance with the signal indicating the operating condition of the external device. The second regulated voltage VB, which corresponds to the input level of the external device subsequent to the change, is generated in accordance with the set value.

Figure 7:
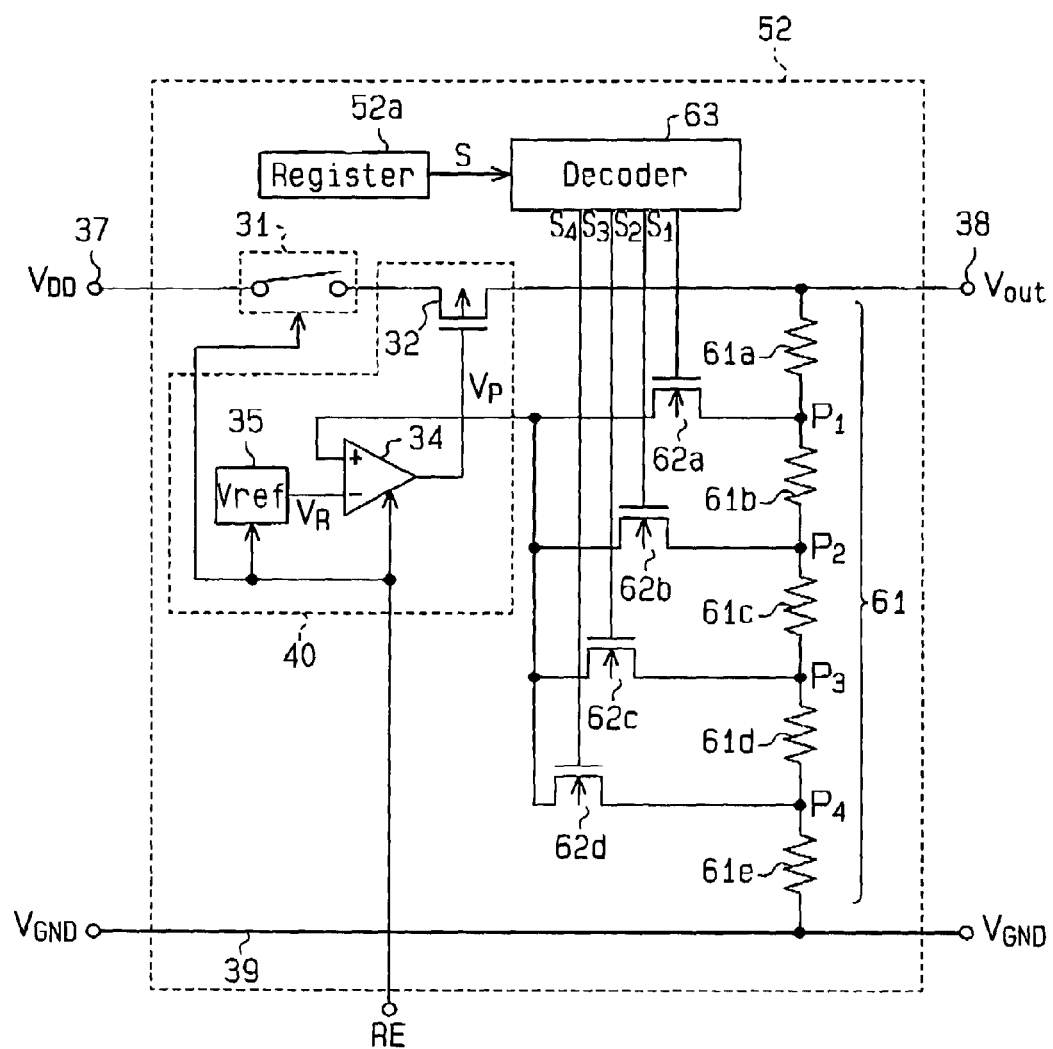
FIG. 7 is a circuit diagram of a second regulator of the imaging apparatus of FIG. 6.

FIG. 7 is a circuit diagram of the second regulator 52. The second regulator 52 includes a voltage regulator unit 40, which has a p-channel transistor 32, a comparator 34, and a reference voltage generation circuit 35. The second regulator 52 also includes a resistor string 61, four n-channel transistors 62a-62d, a decoder 63, and a register 52a.

The voltage regulator unit 40 is connected between the switch 31 and the resistor string 61. The comparator 34 controls the ON resistance of the of the p-channel transistor 32 so that a divided voltage VP, which is generated by the resistor string 61, and a reference voltage VR, which is generated by the reference voltage generation circuit 35, are substantially equalized. The resistor string 61 includes a plurality of series-connected resistors 61a-61e. The four n-channel transistors 62a-62d are respectively connected between four nodes P1-P4, which are located between the resistors 61a-61e, and the non-inverting input terminal of the comparator 34. The register 52a prestores a plurality of the set values. The decoder 63 provides the gates of the four n-channel transistors 62a-62d with control signals S1-S4, respectively, in accordance with each set value S. The set value S is set in accordance with the input level of the external device at, for example, two bit digital values (0, 0), (0, 1), (1, 0), or (1, 1). The control signals S1-S4 are decoded to four bit digital values (1, 0, 0, 0), (0, 1, 0, 0), (0, 0, 1, 0), or (0, 0, 0, 1) based on the set value S. The "1" of the control signals S1-S4 is associated with, for example, a high level, and the "0" is associated with a low level. In this manner, the four n-channel transistors 62a-62d are activated and de-activated in response to the control signals S1-S4, and the nodes P1-P4 are selectively connected to the non-inverting input terminal of the comparator 34.

The operation of the second regulator 52 will now be discussed. When a change of the external device occurs, the CPU 16 provides the signal processor 51 with a signal (not shown) indicating the operational voltage of the external device subsequent to the change or operating condition such as the operational timing subsequent to the change. Further, the operating conditions of each circuit in the signal processor 51 are initialized. In this state, the register 52a of the second regulator 52 outputs the set value S in accordance with the signal indicating the operating condition of the external device. The decoder 63 decodes the set value S and provides the control signals S1-S4 to the gates of the four transistors 62a-62d.

Then, the transistors 62a-62d selectively become conductive in response to the control signals S1-S4. This connects one of the nodes P1-P4 with the non-inverting input terminal of the comparator 34. In this manner, a single divided voltage is selected from a plurality of divided voltages VP1-VP4, and the selected divided voltage VP is supplied to the comparator 34. The comparator 34 controls the ON resistance of the p-channel transistor 32 so that the selected divisional voltage VP and the reference voltage VR, which is supplied from the reference voltage generation circuit 35, are substantially equalized. Further, the comparator 34 generates a second regulated voltage VB, which is in accordance with the input level of the changed external device.

Since the second regulator 52 selects one of the divisional voltages VP1-VP4, which differ from one another, at the nodes P1-P4, the second regulated voltage VB is variably controlled. That is, a change of the external device is coped with by setting the resistance of each of the resistors 61a-61e in accordance with the input level of each of the external devices, which may be connected to the signal processor. The variable regulated voltage is especially effective when the signal processor incorporates a regulator. In other words, even if a change of the external device occurs, the signal processor does not have to be changed. This prevents a change of the external device from increasing costs.

In the same manner as the first and second regulators 22, 23 of FIG. 2, the second regulator operates in accordance with the control signal RE. That is, when the control signal RE has a level corresponding to a state in which the system bus 15 is not being used, the second regulator 52 stops generating the second regulated voltage VB. Further, the second regulator 52 stops operating.

Figure 8:
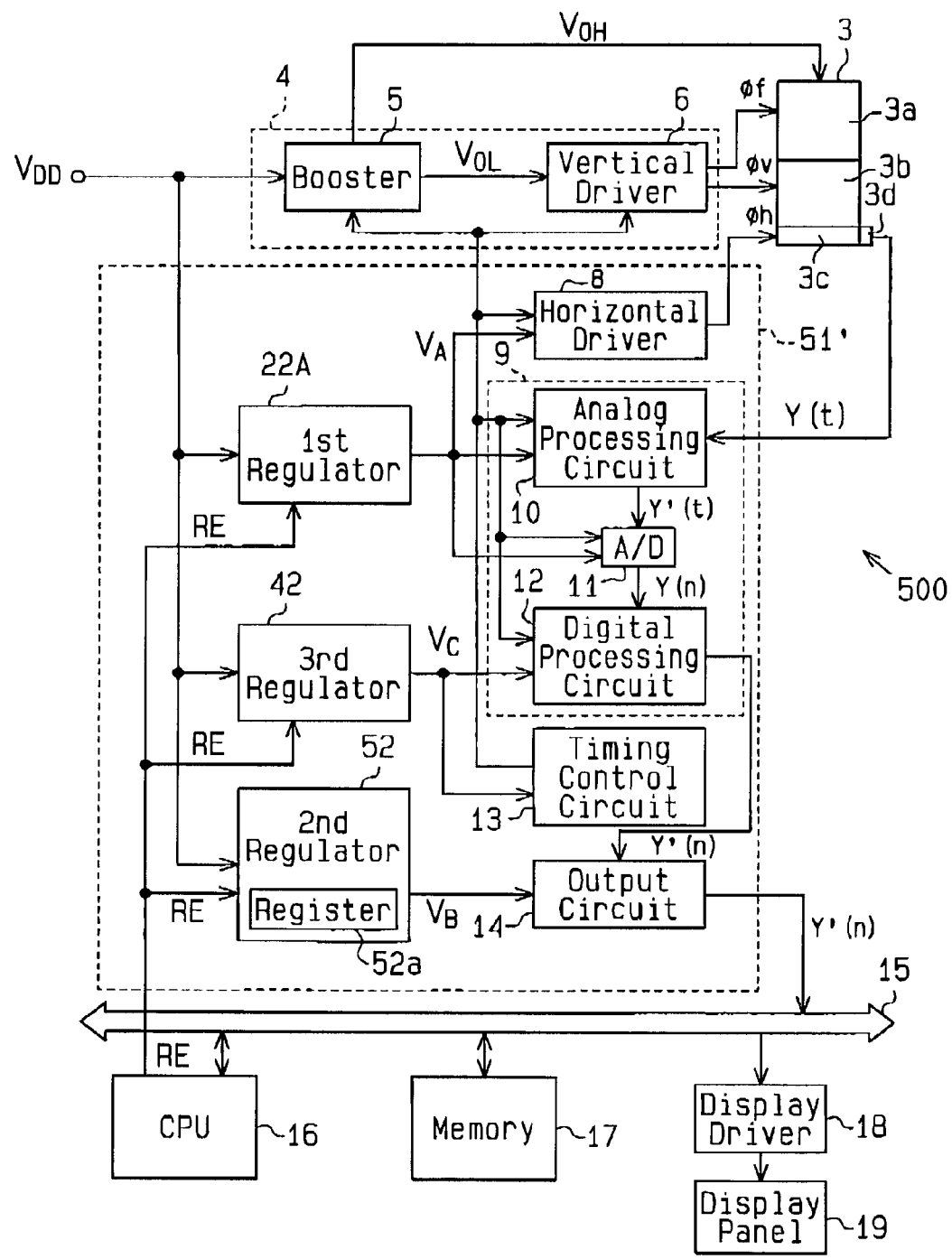
FIG. 8 is a schematic block diagram of a first modification of the imaging apparatus of FIG. 6.
Figure 9:
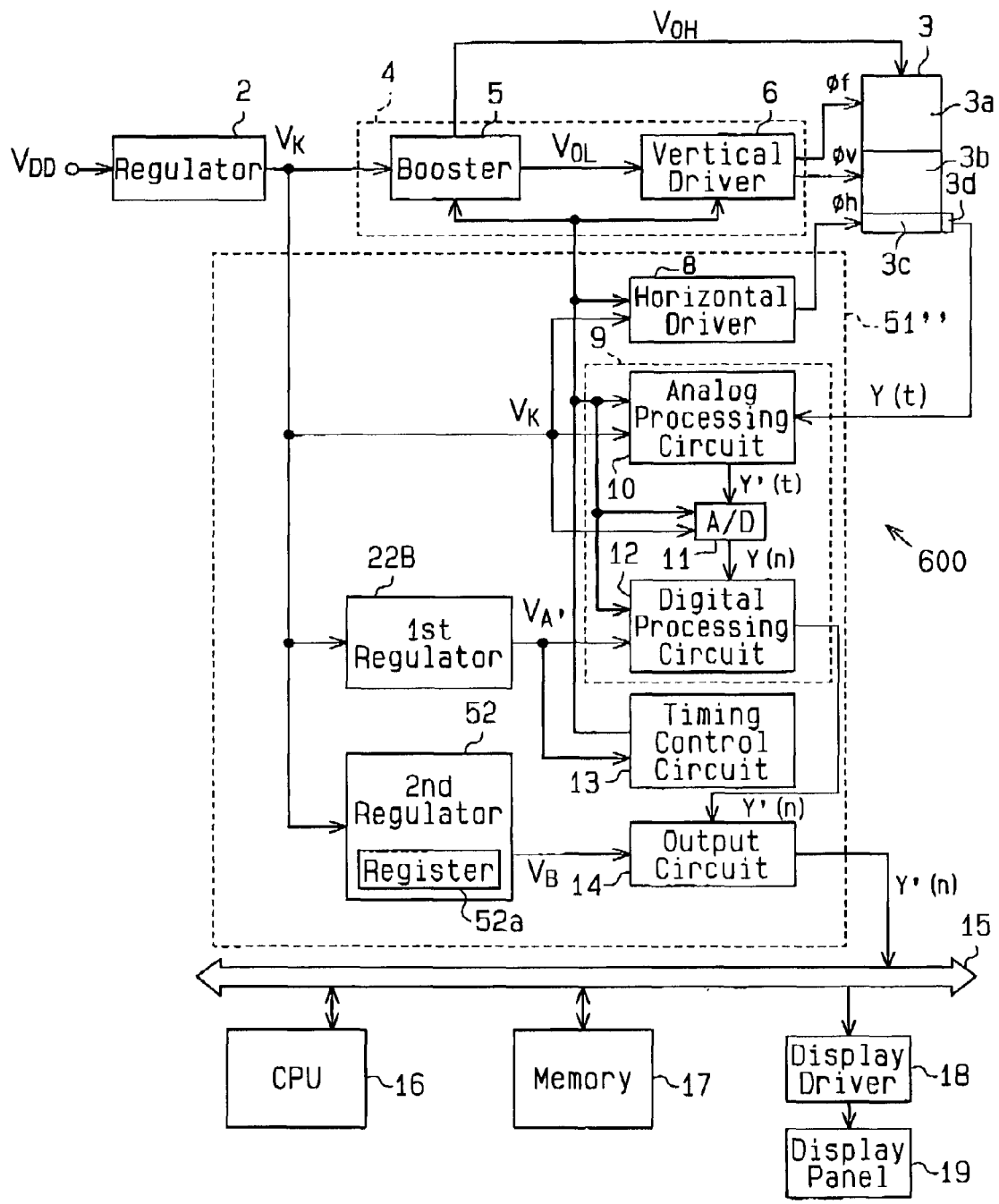
FIG. 9 is a schematic block diagram of a second modification of the imaging apparatus of FIG. 6.

The imaging apparatus 400 of the fourth embodiment shown in FIG. 6 may be modified as shown in FIG. 8 to an imaging apparatus 500, which includes a third regulator 42 corresponding to the digital processing circuit 12. The imaging apparatus 500 further decreases power consumption and improves the operational characteristic of the analog processing circuit 10 and the digital processing circuit 12. Further, the imaging apparatus 400 of the fourth embodiment may be modified as shown in FIG. 9 to an imaging apparatus 600, which includes the external regulator 2, the first regulator 2, the first regulator 22 and the second regulator 52. The output voltage (regulated voltage VK) of the external regulator 2 is supplied to the horizontal driver 8, the analog processing circuit 10 and the A/D converter 11. The first regulator 22 generates a first regulated voltage VA' (e.g., 2V) from the regulated voltage VK and supplies the first regulated voltage VA' to the digital processing circuit 12 and the timing control circuit 13. However, in this case, it is required that the operation voltage of the output circuit 14 be less than the output voltage of the external regulator 2.

Figure 10:
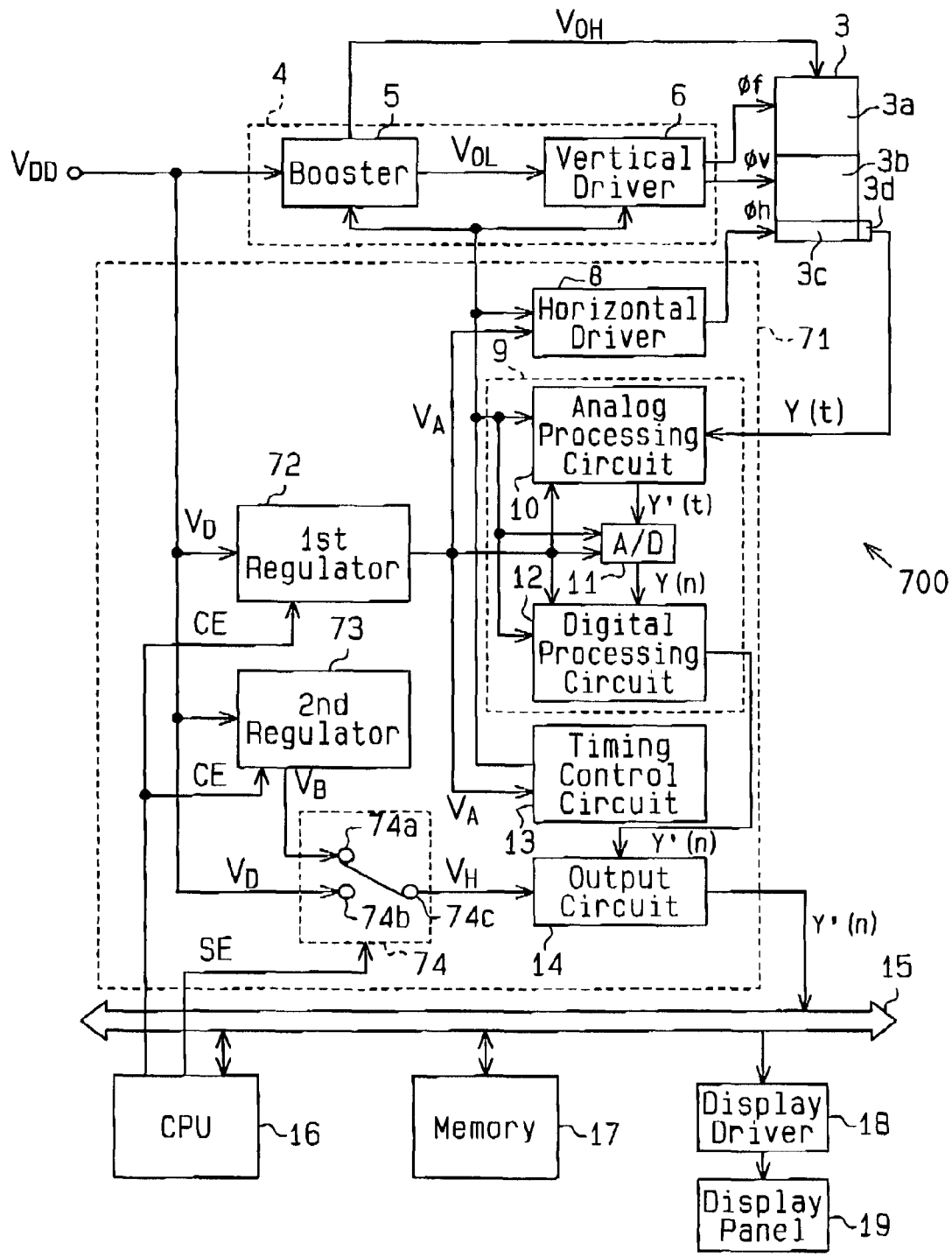
FIG. 10 is a schematic block diagram of an imaging apparatus according to a second embodiment of the present invention.

FIG. 10 is a schematic block diagram of an imaging apparatus 700 according to a fifth embodiment of the present invention. The imaging apparatus 700 of the fifth embodiment includes the CCD image sensor 3, the drive device 4, and a signal processor 71. The signal processor 71 includes the horizontal driver 8, the signal processing circuit 9, the timing control circuit 13, the output circuit 14, a first regulator 72, a second regulator 73, and a switch circuit 74.

The first and second regulators 72, 73 are each connected to a battery (not shown) via a power supply terminal to receive a power supply voltage VDD from the battery. The first regulator 72 generates a first regulated voltage VA from the power supply voltage VDD. The second regulator 73 generates a second regulated voltage VB from the power supply voltage VDD. The first regulated voltage VA is substantially equal to the optimal operational voltage of the horizontal driver 8 and the signal processing circuit 9 (e.g., 2.0 to 2.5V). That is, the first regulated voltage VA is set in accordance with the output level of the CCD image sensor 3. The second regulated voltage VB is set in accordance with the optimum operational voltage of the output circuit 14 (e.g., 2.9V), or the input level of external device.

The first and second regulators 72, 73 are operated in accordance with the operational state of the CCD image sensor 3. More specifically, the CPU 16 generates a control signal CE, which is in accordance with the operational state of the CCD image sensor 3. The regulators 72, 73 receive the control signal CE from the CPU 16 and operate in accordance with the control signal CE. When the CCD image sensor 3 stops operating, the regulators 72, 73 stop outputting the first and second regulated voltages VA, VB and decrease the output voltage to a ground voltage VG (e.g., 0V) in accordance with the control signal CE. By stopping the operations of the regulators 72, 73 in accordance with the operational state of the CCD image sensor 3, the supply of the first and second regulated voltages VA, VB is stopped when the CCD image sensor 3 is not operating. Thus, unnecessary power consumption is avoided when the CCD image sensor 3 is not operating.

The switch circuit 74 is supplied with the power supply voltage VDD and the second regulated voltage VB and selectively supplies either one of the power supply voltage VDD and the second voltage VB to the output circuit 14 in accordance with the input level of the external device. The switch circuit 74 includes two input terminals 74a, 74b and an output terminal 74c. The input terminal 74a is connected to the second regulator 73, and the input terminal 74b is connected to the power supply terminal. The switch circuit 74 has an output terminal 74c connected to the output circuit 14. The switch circuit 74 receives the control signal SE from the CPU 16 and switches the output voltage VH in response to the control signal SE. The CPU 16 provides the switch circuit 74 with the control signal SE to switch the output voltage in accordance with the operating state of the CCD image sensor 3 and the external device. The switch circuit 74 switches the connection state of the two input terminals 74a, 74b and the output terminal 74c to selectively provide the output circuit 14 with either one of the power supply voltage VDD and the second regulated voltage VB in accordance with the control signal SE.

Figure 11:
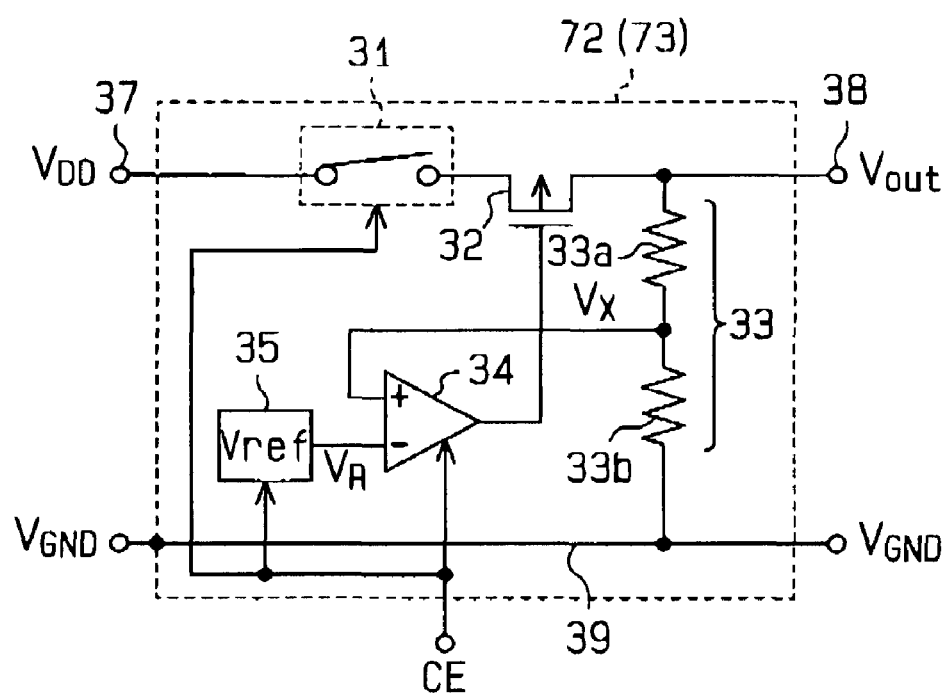
FIG. 11 is a schematic circuit diagram of first and second regulators of the imaging apparatus of FIG. 2.

FIG. 11 is a schematic circuit diagram of the first and second regulators 72, 73. The first and second regulators 72, 73 basically have the same configuration as the first and second regulators 22, 23 of FIG. 2. However, the first and second regulators 72, 73 differ from the first and second regulators 22, 23 in that the switch 31, the resistor string 33, the comparator 34, and the reference voltage generation circuit 35 operate in accordance with the operating state of the CCD image sensor 3.

The switch 31, the comparator 34, and the reference voltage generation circuit 35 receive the control signal CE from the CPU 16 and operate in accordance with the operating state of the CCD image sensor 3. More specifically, when the level of the control signal CE corresponds to a state in which the CCD image sensor 3 is being operated, the switch 31 connects the power supply terminal 37 and the p-channel transistor 32. The reference voltage generation circuit 35 generates the reference voltage VR, and the comparator 34 controls the ON resistance of the p-channel transistor 32 to equalize the divided voltage VX and the reference voltage VR. When the level of the control signal CE corresponds to a state in which the CCD image sensor 3 is not being operated, the switch 31 disconnects the power supply terminal 37 and the transistor 32. Thus, the comparator 34 and the reference voltage generation circuit 35 stops operating.

Since the regulators 72, 73 stop functioning when the CCD image sensor 3 is not operating, the amount of power consumed by the regulators 72, 73 decreases. This further reduces the power consumption of the signal processor 71.

Figure 12:
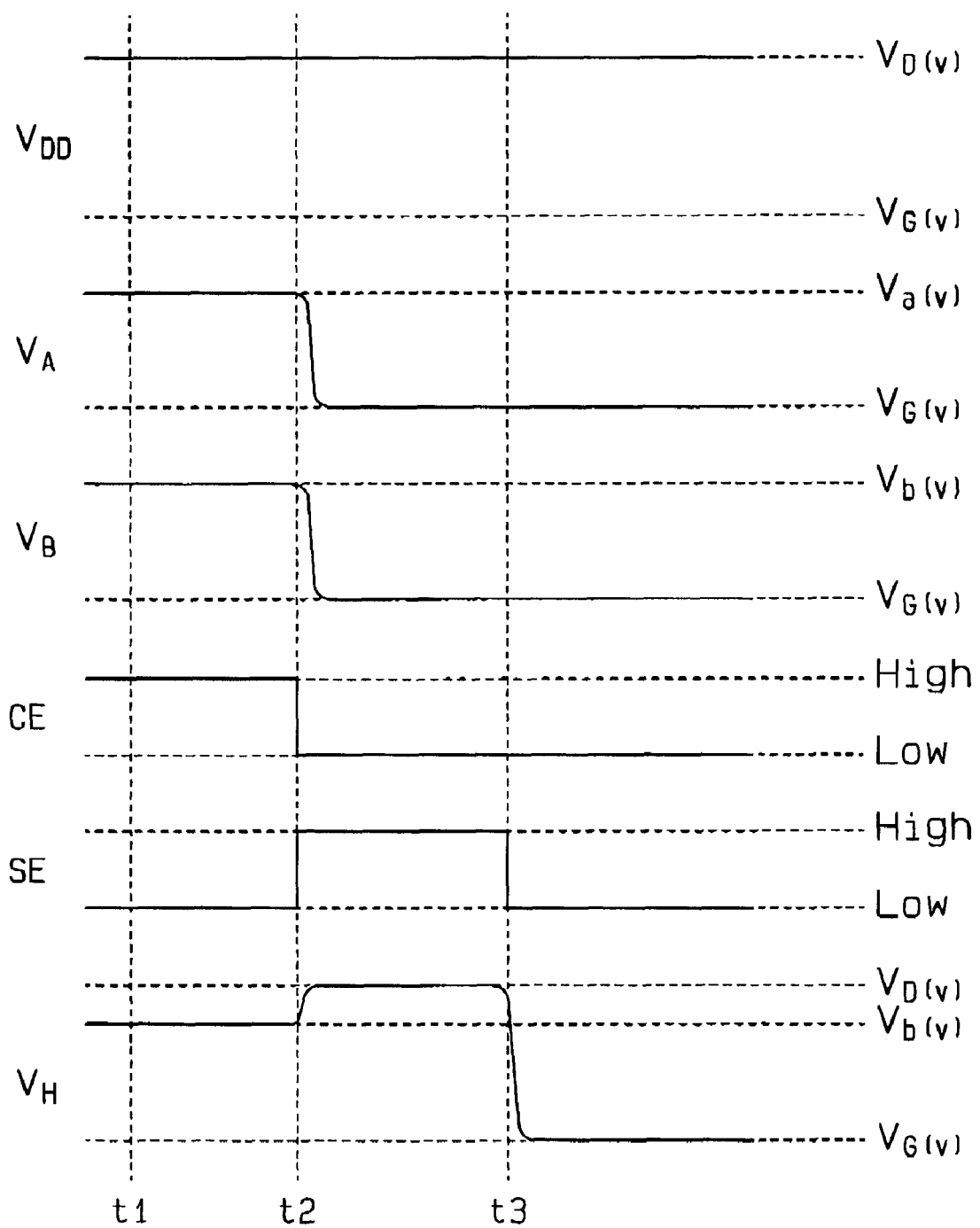
FIG. 12 is a timing chart illustrating the operation of the imaging apparatus of FIG. 10.

FIG. 12 is a timing chart illustrating the operation of the imaging apparatus 700. In FIG. 12, the control signal CE, which is output from the CPU 16, is high when the CCD image sensor 3 is operating and low when the CCD image sensor 3 stops operating. The control signal SE, which is output from the CPU 16, is high when the output voltage VH of the switch circuit 74 is switched to the power supply voltage VDD and low when the output voltage VH is switched to the second regulated voltage VB.

Hereinafter, the value of the power supply voltage VDD is represented by VD[V], and the values of the first and second regulated voltages VA, VB generated by the first and second regulators 72, 73 are represented by Va[V], Vb[V], respectively. Further, the voltage value of the ground VGND is represented by VG[V].

At timing t1 in FIG. 12, the CCD image sensor 3 and the external device are being driven. In this state, the control signal CE is high, and the control signal SE is low. In response to the control signal CE, the first and second regulators 72, 73 receive the power supply voltage VD[V] (e.g., 3.2V) and generate the first regulated voltage VA, or Va[V] (e.g., 2.0V to 2.5V), and the second regulated voltage VB, or Vb[v] (e.g., 2.9V), respectively.

When the control signal SE goes low, the switch circuit 74 connects the input terminal 74a and the output terminal 74c to select the second regulated voltage VB (Vb[V]) as the output voltage VH. Accordingly, the output circuit 14 is supplied with the voltage Vb[V]. In this state, the signal processing circuit 9 performs a predetermined signal process on the image signal Y(t), which is provided from the CCD image sensor 3. In this manner, the processed image signal Y'(n) is provided to the external device via the output circuit 14.

Then, at timing t2, the CCD image sensor 3 stops operating but the external device continue to operate. In this state, the control signal CE goes low, and the control signal SE goes high. In response to the low control signal CE, the first and second regulators 72, 73 stop outputting the associated first and second regulated voltages VA, VB. Thus, the output voltages of the first and second regulators 72, 73 are set at VG[V] (e.g., 0V).

In response to the high control signal SE, the switch circuit 74 connects the input terminal 74b and the output terminal 74c and selects the power supply voltage VDD as the output voltage VH. This stops supplying the signal processing circuit 9 with the operational voltage and supplies only the output circuit 14 with the operational voltage VD[V]. In this state, the output of the output circuit 14 is set at a high impedance state. This prevents current from flowing from the external device to the output circuit 14. Accordingly, the supply of the power supply voltage to the signal processing circuit 9 is stopped while maintaining connection between the signal processor 21 and the external device. In other words, even though the external device is operating, the supply of the power supply voltage to the signal processing circuit 9 is stopped in accordance with the operating state of the CCD image sensor 3.

At timing t3, in addition to the CCD image sensor 3, the operation of the external device is stopped. In this state, the control signal CE remains low, and the control signal SE goes low. In response to the low control signal SE, the switch circuit 74 selects the second regulated voltage VB while the first and second regulators 72, 73 continue to stop the output of the first and second regulated voltages VA, VB. This stops supplying the output circuit 14 with the power supply voltage. Accordingly, when the CCD image sensor 3 and the external device are not operating, the signal processing circuit 9 and the output circuit 14 are not supplied with the power supply voltage.

The signal processor 71 does not necessarily have to be supplied with the limited power supply voltage from the battery and may be supplied with regulated power supply voltage. Under such condition, the value of the regulated voltage may be set at the input level of the external device, or at the power supply voltage required by the output circuit 14 (e.g., 2.9V).

In such a case, when the CCD image sensor 3 is operating, the switch circuit 74 selects the regulated power supply voltage VDD. As a result, the regulated power supply voltage VDD is directly supplied to the output circuit 14 and not by way of the second regulator 73. This suppresses power consumption. When the power supply voltage is supplied via a regulator, power is consumed in a state in which a relatively large voltage drop occurs at the regulator, Therefore, when the power supply voltage VDD and the operational voltage of the output circuit 14 are substantially the same, such power consumption is avoided by directly supplying the output circuit 14 with the power supply voltage VDD. Further, the signal processor 71 operates in the same manner as illustrated in FIG. 12 when the external device is operating. When the external device is operating, the switch circuit 74 selects the power supply voltage VDD and maintains the connection state of the system bus 15. When the external device stops operating, the switch circuit 74 selects the second regulated voltage VB and stops supplying the output circuit 14 with the power supply voltage.

Figure 13:
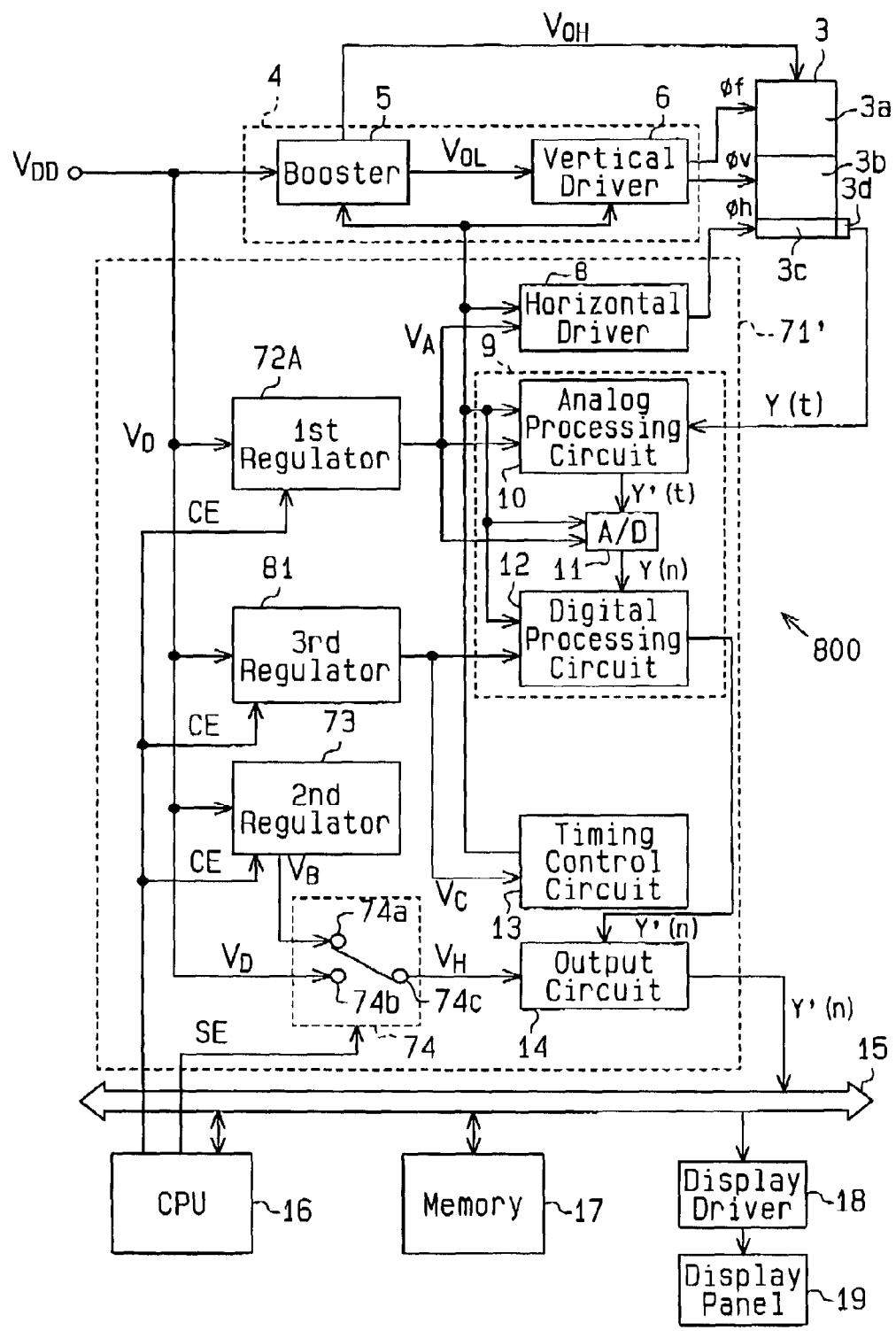
FIG. 13 is a schematic block diagram of a first modification of the imaging apparatus of FIG. 10.

FIG. 13 is a schematic block diagram of an imaging apparatus 800 according to first modification of the fifth embodiment of the present invention. As shown in FIG. 13, in addition to the configuration of the signal processor 71' of FIG. 10, the signal processor 71' of the imaging apparatus 800 further includes a third regulator 81. The third regulator 81 operates in the same manner as the third regulator 42 of FIG. 4.

In the first modification of the fifth embodiment, the supply of the power supply voltage to the analog processing circuit 10 and the digital processing circuit 12 is stopped and power is not consumed by the regulators 72A, 73, 81 when the CCD image sensor 3 is not operating. As a result, the power consumption of the imaging apparatus 800 is reduced, and the operational characteristics of the analog processing circuit 10 and the digital processing circuit 12 are improved.

Figure 14:
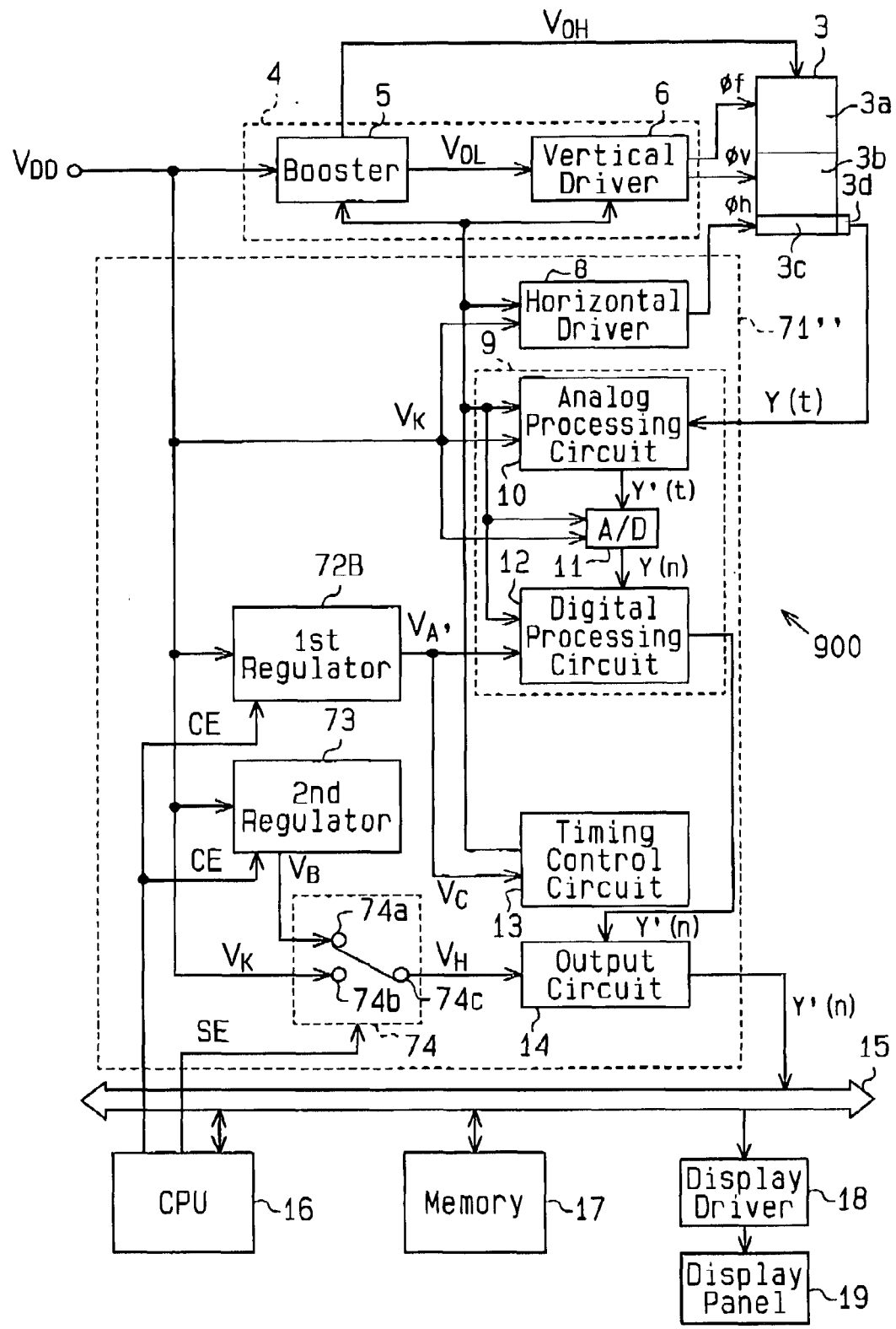
FIG. 14 is a schematic block diagram of a second modification of the imaging apparatus of FIG. 10.

As shown in FIG. 14, the imaging apparatus 800 of the first modification may be modified to an imaging apparatus 900 that employs the external regulator 2 of FIG. 1. In the modification, the regulated voltage VK of the external regulator 2 is supplied to the analog processing circuit 10, the A/D converter 11, the first regulator 72B, the second regulator 73, and the switch circuit 74 in the same manner as the imaging apparatus 300 of the third embodiment shown in FIG. 5.

The first regulator 72B, which is connected to the digital processing circuit 12 and the timing control circuit 13, generates a first regulated voltage VA', which is substantially equal to the optimum operational voltage of the digital processing circuit 12 and the timing control circuit 13 (e.g., 2.0V).

Figure 15:
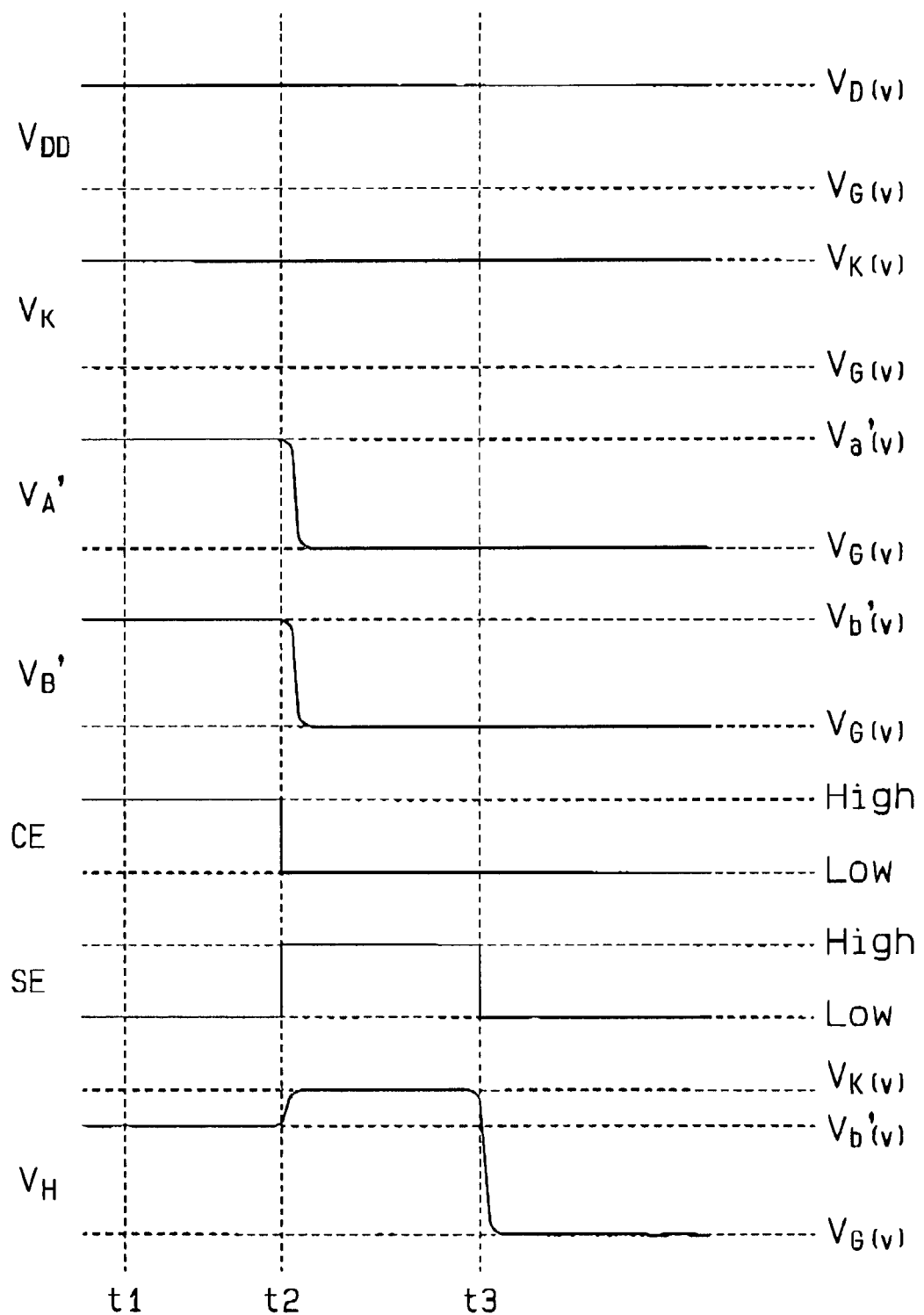
FIG. 15 is a timing chart illustrating the operation of the imaging apparatus of FIG. 14.

As shown in FIG. 15, at timing t1 to t2 during which the imaging apparatus 300 and the external device are both operating, the input terminal 74a of the switch circuit 74 is selected and the output circuit 14 is supplied with the second regulated voltage VB'. At timing t2 to t3 during which only the imaging apparatus 900 stops operating, the input terminal 74b of the switch circuit 74 is selected and the output circuit 14 is supplied with the regulated voltage VK.

Subsequent to timing t3 at which the imaging apparatus 900 and the external device both stop operating, the input terminal 74a of the switch circuit 74 is selected, and the output circuit 14 is supplied with the output voltage VG[V] (e.g., 0V) of the second regulator 73. As a result, the output circuit 14 is supplied with voltage that is in accordance with the operating state of the imaging apparatus 900 and the external device.

Figure 16:
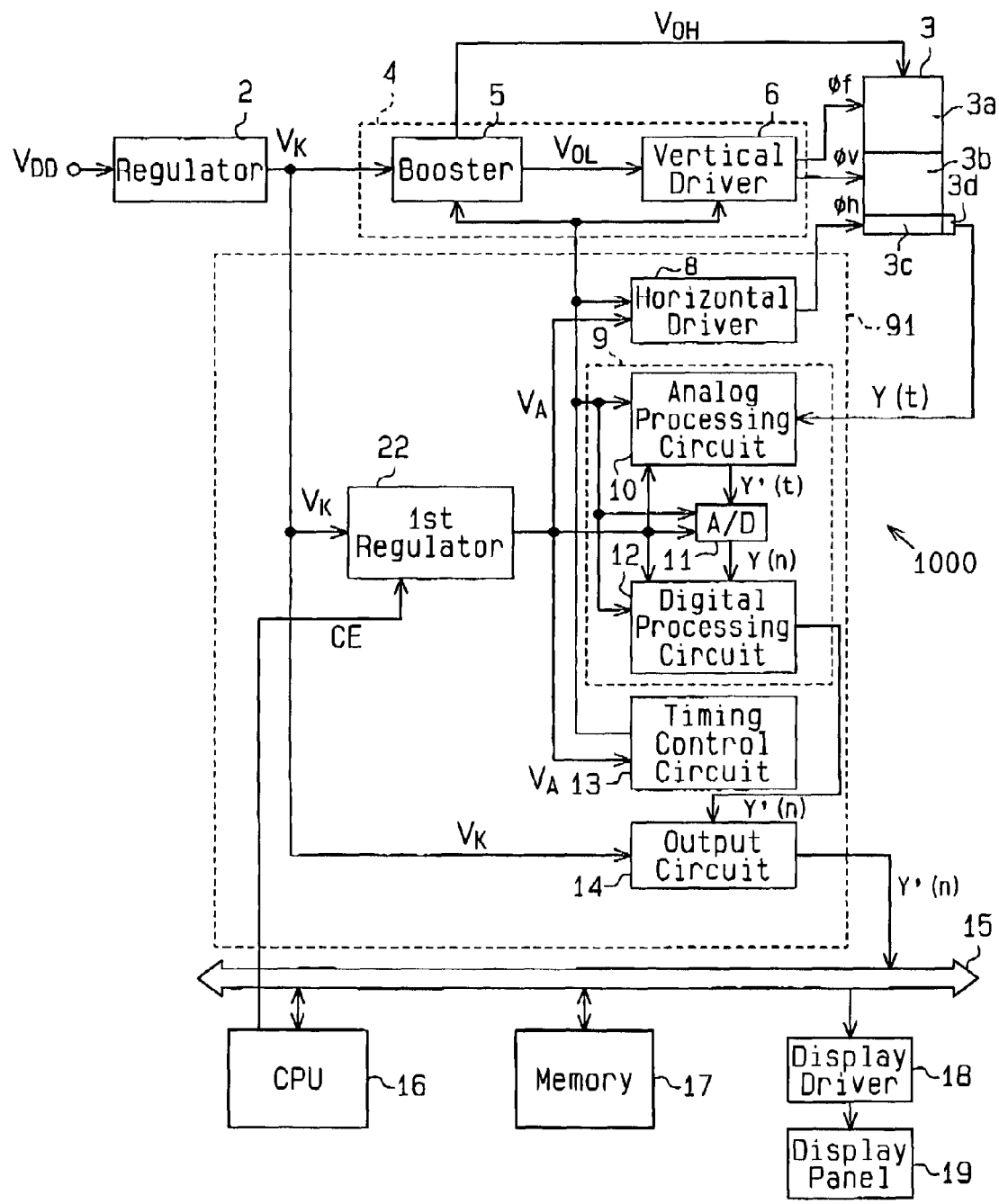
FIG. 16 is a schematic block diagram of an imaging apparatus according to a sixth embodiment of the present invention.

FIG. 16 is a schematic block diagram of an imaging apparatus 1000 according to a sixth embodiment of the present invention. The imaging apparatus 1000 of the sixth embodiment includes the external regulator 2 and the first regulator 22. The sixth embodiment differs from the first to sixth embodiments in that the output voltage (regulated voltage VK) of the external regulator 2 is supplied to the output circuit.

The imaging apparatus 1000 includes the external regulator 2, the CCD image sensor 3, the drive device 4, and a signal processor 91. The signal processor 91 includes the horizontal driver 8, the signal processing circuit 9, the timing control circuit 13, the output circuit 14, and the first regulator 22.

The external regulator 2 is supplied with power supply voltage VDD of a power supply, such as a battery, and generates regulated voltage VK, which is substantially the same as the operational voltage (e.g., 2.9V) of the output circuit 14.

The first regulator 22 is supplied with the regulated voltage VK from the external regulator 2 and generates the first regulated voltage VA (e.g., 2.0-2.5V). The first regulated voltage VA is supplied to the horizontal driver 8, the signal processing circuit 9, and the timing control circuit 13. The switch of the first regulator 22 operates in response to the control signal CE, which indicates the operational state of the CCD image sensor 3. That is, when the control signal CE is, for example, high and indicates that the CCD image sensor 3 is operating, the switch 31 becomes conductive. This generates the first regulated voltage VA. When the control signal CE is low and indicates that the CCD image sensor 3 is not operating, the switch 31 disconnects the power supply terminal and the p-channel transistor 32. This stops the generation of the first regulated voltage VA. In this manner, when the imaging apparatus 1000 stops operating, operational voltage is not supplied to the horizontal driver 8, the signal processing circuit 9, and the timing control circuit 13.

In the sixth embodiment, the signal processing circuit 9 and the output circuit 14 are independently supplied with power supply voltage. Thus, the signal processing circuit 9 and the output circuit 14 are each supplied with the optimum operational voltage. This decreases the power consumption of the imaging apparatus 1000 and improves the operating characteristic of the signal processing circuit 9.

Figure 17:
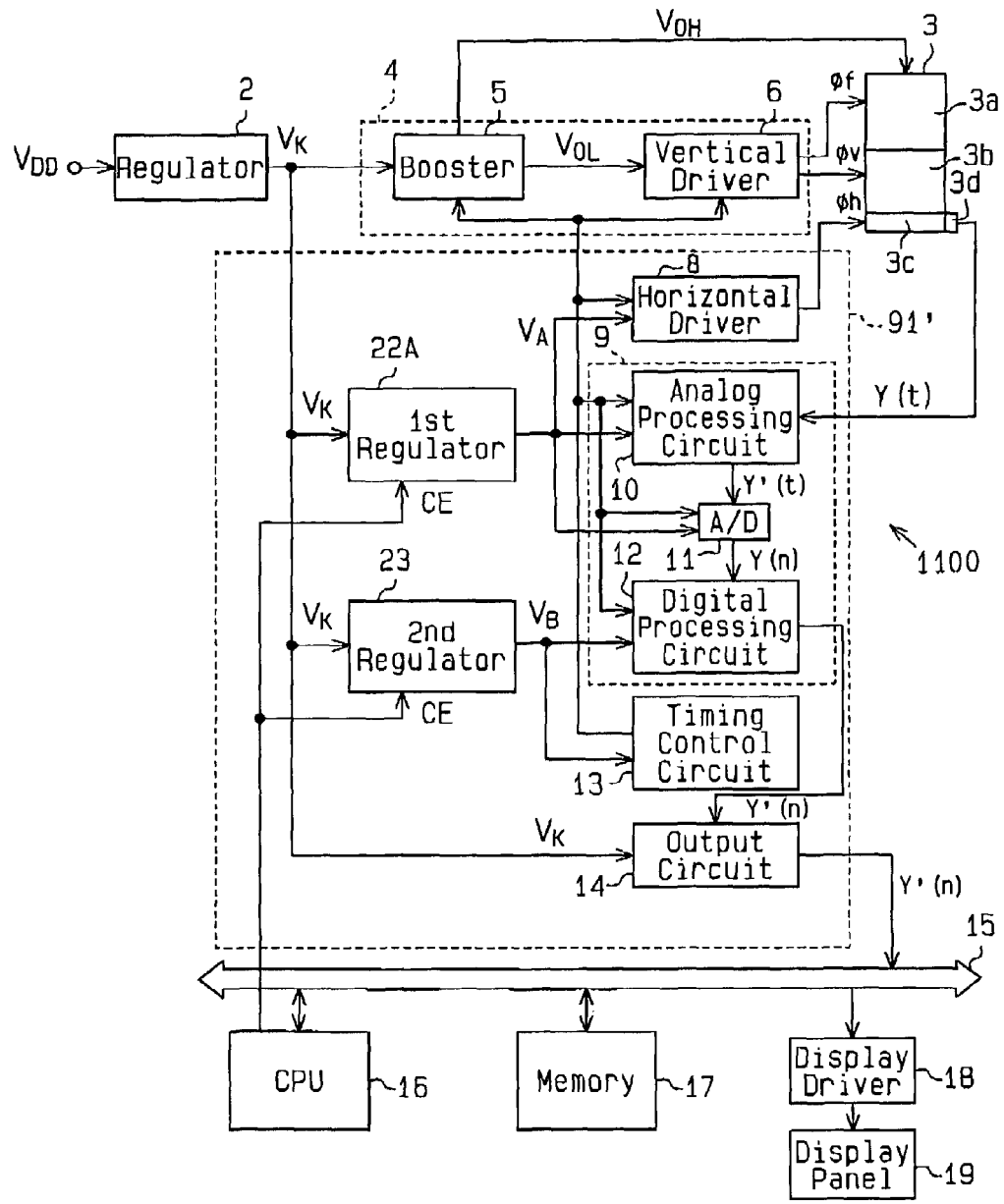
FIG. 17 is a schematic block diagram of a first modification of the imaging apparatus of FIG. 16.

The imaging apparatus 1000 of the sixth embodiment may be modified to an imaging apparatus 1100 including a second regulator 73, which corresponds to the digital processing circuit 12, as shown in FIG. 17. The imaging apparatus 1100 further decreases power consumption and improves the operational characteristics of the analog processing circuit 10 and the digital processing circuit 12.

Figure 18:
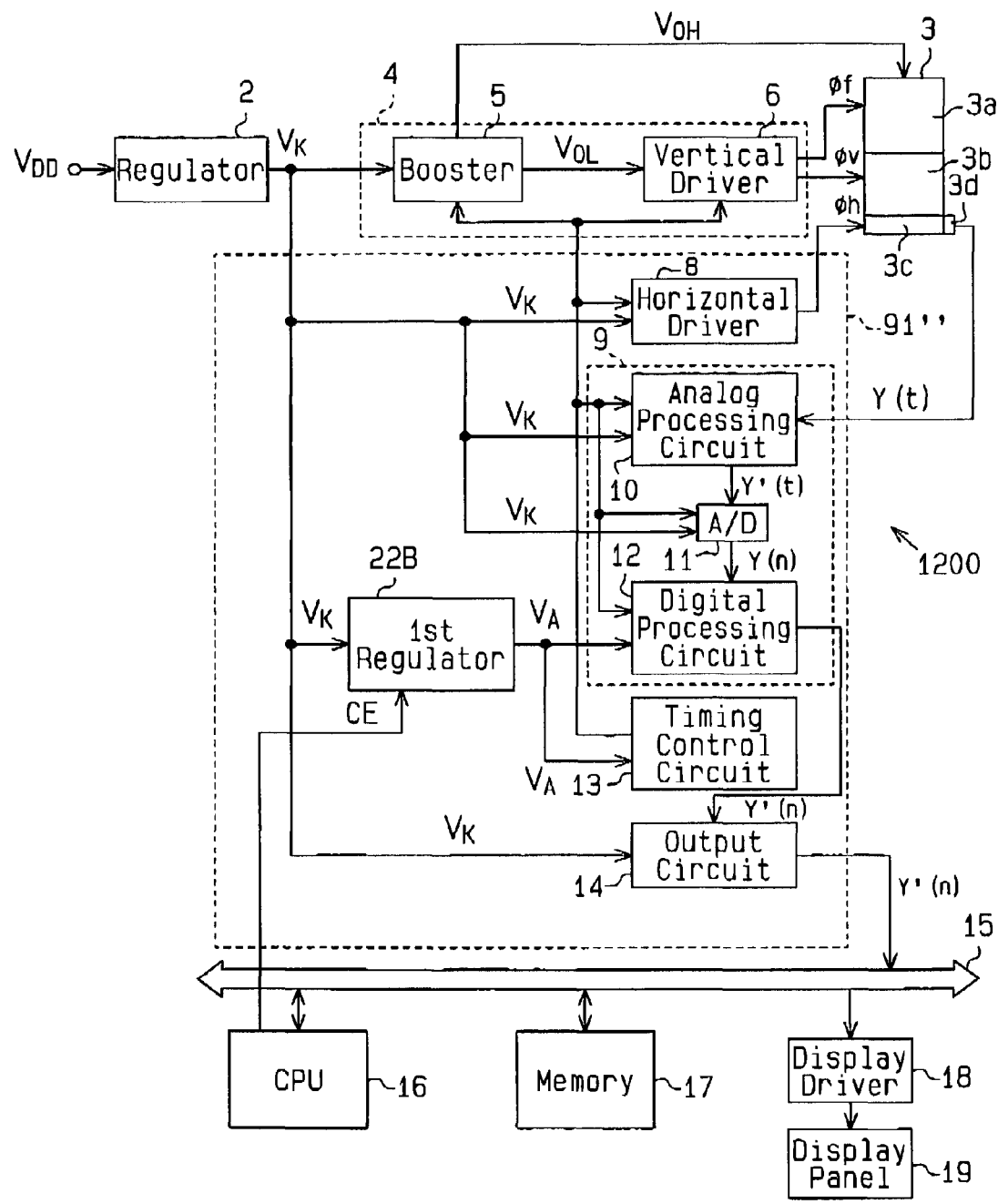
FIG. 18 is a schematic block diagram of a second modification of the imaging apparatus of FIG. 16.

The imaging apparatus 1000 of the sixth embodiment may be modified to an imaging apparatus 1200, as shown in FIG. 18. In the imaging apparatus 1200, the regulated voltage VK (e.g., 2.5V), which is generated by the external regulator 2, is supplied to the horizontal driver 8, the analog processing circuit 10, and the A/D converter 11 in addition to the output circuit 14. In this case, it is required that the operational voltage of the output circuit 14 be close enough to the operational voltage of the horizontal driver 8, the analog processing circuit 10, and the A/D converter 11.

It should be apparent to those skilled in the art that the present invention may be embodied in many other specific forms without departing from the spirit or scope of the invention. Particularly, it should be understood that the present invention may be embodied in the following forms.

In addition to an imaging apparatus employing a frame-transfer type CCD image sensor, the present invention may also be applied to an imaging apparatus employing an interline type CCD image sensor.

In each embodiment, the operational voltage supplied to the horizontal driver 8 may be varied in accordance with, for example, the specification of the CCD image sensor 3. For example, if the optimum operational voltage of the horizontal driver 8 is closer to the operational voltage of the digital processing circuit 12 and the timing control circuit 13 than the operational voltage of the analog processing circuit 10 and the A/D converter 11, the horizontal driver 8 may be supplied with substantially the same voltage as the digital processing circuit 12 and the timing control circuit 13.

The present examples and embodiments are to be considered as illustrative and not restrictive, and the invention is not to be limited to the details given herein, but may be modified within the scope and equivalence of the appended claims.

What is claimed is:

1. An imaging apparatus for performing a signal process on a first image signal and for generating a second image signal that (i) is forwarded to an external device and (ii) has format, the imaging apparatus comprising:
   a solid-state imaging device comprising a matrix of light receiving pixels to generate information charges that correspond to an imaging subject and to accumulate the information charges to generate the first image signal;
   a booster configured to receive a power supply voltage and to boost the power supply voltage to generate a boosted voltage;
   a first regulator configured to receive the power supply voltage and to generate a first regulated voltage that corresponds to an output level of the solid-state imaging device, wherein the first regulated voltage is lower than the power supply voltage;
   a second regulator configured to receive the power supply voltage and to generate a second regulated voltage that corresponds to an input level of the external device, wherein the second regulated voltage is lower than the power supply voltage and higher than the first regulated voltage;
   a drive circuit configured to receive the boosted voltage, wherein the drive circuit is configured to drive the solid-state imaging device to transfer information charges accumulated in the light receiving pixels to generate the first image signal;
   a signal processing circuit configured to operate with the first regulated voltage, wherein the signal processing circuit is configured to perform the signal process on the first image signal to generate the second image signal; and
   an output circuit configured to operate with the second regulated voltage, wherein the output circuit is configured to receive the second image signal from the signal processing circuit and to output the second image signal to the external device.

2. The imaging apparatus according to claim 1, wherein the output circuit is electrically connected to the external device via a bus, and wherein the first and second regulators are configured to stop generating the first and second regulated voltages during at least part of a time when the bus is not in use.

3. The imaging apparatus according to claim 1, wherein the second regulator is configured to shift the second regulated voltage in accordance with a change of the input level of the external device.

4. The imaging apparatus according to claim 3, wherein the second regulator is configured to generate a plurality of voltages and to select one of the plurality of voltages to be the second regulated voltage in accordance with the input level of the external device.

5. The imaging apparatus according to claim 3, wherein the second regulator is configured to selectively generate, in accordance with the input level of the external device, one of a plurality of voltages for use as the second regulated voltage.

6. The imaging apparatus according to claim 1, further comprising:
   a switch electrically connected to the second regulator and to the output circuit, wherein the switch is for selecting one of the power supply voltage and the second regulated voltage in accordance with an operating state of at least one of the solid-state imaging device and the external device, the selected voltage being supplied to the output circuit.

7. The imaging apparatus according to claim 1, further comprising:
   a third regulator configured to receive the power supply voltage and to generate a third regulated voltage;
   wherein the signal processing circuit comprises:
   an analog processing circuit configured to operate with the first regulated voltage, wherein the analog processing circuit is configured to perform analog signal processing on the first image signal; and
   a digital processing circuit configured to operate with the third regulated voltage, wherein the digital processing circuit is configured to perform digital signal processing on a digital first image signal to generate the second image signal, the digital first image signal being obtained from the first image signal following analog signal processing of the first image signal.

8. The imaging apparatus according to claim 7, wherein the third regulated voltage is less than the first regulated voltage.

9. The imaging apparatus according to claim 7, wherein the output circuit is electrically connected to the external device by a bus, and wherein the first, second and third regulators are configured to stop generating the first, second and third regulated voltages, respectively, during at least part of a time when the bus is not in use.

10. The imaging apparatus according to claim 7, wherein the second regulator is configured to shift the second regulated voltage in accordance with a change of the input level of the external device.

11. The imaging apparatus according to claim 10, wherein the second regulator is configured to generate a plurality of voltages and to select one of the plurality of voltages in accordance with the input level of the external device.

12. The imaging apparatus according to claim 10, wherein the second regulator is configured to selectively generate, in accordance with the input level of the external device, one of a plurality of voltages for use as the second regulated voltage.

13. The imaging apparatus according to claim 1, further comprising:
   an external regulator to generate a regulated power supply voltage, wherein the external regulator is configured to provide the regulated power supply voltage to the first and second regulators for use as the power supply voltage;
   wherein the signal processing circuit comprises:
   an analog processing circuit configured to operate with the regulated power supply voltage, wherein the analog processing circuit is configured to perform analog signal processing on the first image signal; and
   a digital processing circuit configured to operate with the first regulated voltage, wherein the digital processing circuit is configured to perform digital signal processing on a digital first image signal to generate the second image signal, the digital first image signal being obtained from the first image signal following analog signal processing of the first image signal.

14. The imaging apparatus according to claim 13, wherein the second regulator is configured to shift the second regulated voltage in accordance with a change of the input level of the external device.

15. The imaging apparatus according to claim 14, wherein the second regulator is configured to generate a plurality of voltages and to select one of the plurality of voltages in accordance with the input level of the external device.

16. The imaging apparatus according to claim 14, wherein the second regulator is configured to selectively generate, in accordance with the input level of the external device, one of a plurality of voltages for use as the second regulated voltage.

17. The imaging apparatus according to claim 13, further comprising:
a switch electrically connected to the second regulator and the output circuit, wherein the switch is for selecting one of the regulated power supply voltage and the second regulated voltage in accordance with an operating state of at least one of the solid-state imaging device and the external device, the selected voltage being supplied to the output circuit.

18. An imaging apparatus for performing a signal processing on a first image signal and for generating a second image signal that (i) is forwarded to an external device and (ii) has a format, the imaging apparatus comprising:
a solid-state imaging device comprising a matrix of light receiving pixels to generate information charges that correspond to an imaging subject and to accumulate the information charges to generate the first image signal;
a booster configured to receive a power supply voltage and to boost the power supply voltage to generate a boosted voltage;
a first regulator configured to receive the power supply voltage and to generate a first regulated voltage that corresponds to an output level of the solid-state imaging device, wherein the first regulated voltage is lower than the power supply voltage;
a drive circuit configured to receive the boosted voltage, wherein the drive circuit is configured to drive the solid-state imaging device to transfer the information charges accumulated in the light receiving pixels to generate the first image signal;
a signal processing circuit configured to operate with the first regulated voltage, wherein the signal processing circuit is configured to perform a signal process on the first image signal to generate the second image signal;
an output circuit configured to operate with the power supply voltage, wherein the output circuit is configured to receive the second image signal from the signal processing circuit and to output the second image signal to the external device; and
a second regulator configured to receive the power supply voltage and to generate a second regulated voltage;
wherein the power supply voltage corresponds to an input level of the external device; and
wherein the signal processing circuit comprises:
an analog processing circuit configured to operate with the first regulated voltage, wherein the analog processing circuit is configured to perform analog signal processing on the first image signal; and
a digital processing circuit configured to operate with the second regulated voltage, wherein the digital processing circuit is configured to perform digital signal processing on a digital first image signal to generate the second image signal, the digital first image signal being obtained from the first image signal following analog signal processing of the first image signal.

19. The imaging apparatus according to claim 18, wherein the second regulated voltage is less than the power supply voltage.

20. The imaging apparatus according to claim 18, wherein the second regulator is configured to stop generating the second regulated voltage during at least part of a time when the solid-state imaging device is not operating.

21. An imaging apparatus for performing a signal processing on a first image signal and for generating a second image signal that (i) is forwarded to an external device and (ii) has a format, the imaging apparatus comprising:
a solid-state imaging device comprising a matrix of light receiving pixels to generate information charges that correspond to an imaging subject and to accumulate the information charges to generate the first image signal;
a booster configured to receive a power supply voltage and to boost the power supply voltage to generate a boosted voltage;
a first regulator configured to receive the power supply voltage and to generate a first regulated voltage that corresponds to an output level of the solid-state imaging device, wherein the first regulated voltage is lower than the power supply voltage,
a drive circuit configured to receive the boosted voltage, wherein the drive circuit is configured to drive the solid-state imaging device to transfer the information charges accumulated in the light receiving pixels to generate the first image signal;
a signal processing circuit configured to operate with the first regulated voltage, wherein the signal processing circuit is configured to perform a signal process on the first image signal to generate the second image signal; and
an output circuit configured to operate with the power supply voltage, wherein the output circuit is configured to receive the second image signal from the signal processing circuit and to output the second image signal to the external device;
wherein the power supply voltage corresponds to an input level of the external device; and
wherein the signal processing circuit comprises:
an analog processing circuit configured to operate with the power supply voltage, wherein the analog processing circuit is configured to perform analog signal processing on the first image signal; and
a digital processing circuit configured to operate with the first regulated voltage, wherein the digital processing circuit is configured to perform digital signal processing on a digital first image signal to generate the second image signal, the digital first image signal being obtained from the first image signal following analog signal processing of the first image signal.

22. The imaging apparatus according to claim 21, wherein the first regulator is configured to stop generating the first regulated voltage during at least part of a time when the solid-state imaging device is not operating.

23. A method for supplying a power supply voltage in an imaging apparatus, wherein the imaging apparatus comprises:
a solid-state imaging device for accumulating information charges that correspond to an imaging subject and for generating a first image signal based on the information charges,
a signal processing circuit for performing signal processing on the first image signal to generate a second image signal having a format, and
an output circuit for receiving the second image signal and for outputting the second image signal to an external device,
wherein the method comprises:
using a power supply voltage to generate a first regulated voltage that corresponds to an output level of the solid-state imaging device, wherein the first regulated voltage is lower than the power supply voltage;

supplying the first regulated voltage to the signal processing circuit;

using the power supply voltage to generate a second regulated voltage that corresponds to an input level of the external device, wherein the second regulated voltage is lower than the power supply voltage and higher that the first regulated voltage; and supplying the second regulated voltage to the output circuit, the output circuit being configured to operate with the second regulated voltage.

24. The method according to claim 23, wherein generating the second regulated voltage comprises:

selecting one of a plurality of voltages; and using the selected voltage as the second regulated voltage.

25. The method according to claim 23, further comprising:

selecting one of the power supply voltage and the second regulated voltage in accordance with an operation state of at least one of the solid-state imaging device and the external device; and supplying a selected voltage to the output circuit.

26. The method according to claim 23, wherein the output circuit is electrically connected to the external device by a bus; and further comprising stopping generation of the first and second regulated voltages in response to an indication that the bus is not in use.

* * * * *